US011601720B2

(12) United States Patent
Chipman et al.

(10) Patent No.: US 11,601,720 B2
(45) Date of Patent: *Mar. 7, 2023

(54) CONTENT EVENT MESSAGING

(71) Applicant: Comcast Cable Communications, LLC, Philadelphia, PA (US)

(72) Inventors: Leslie Eugene Chipman, Rockville, MD (US); Amit Bagga, Basking Ridge, NJ (US); Jenny Jiang, Vienna, VA (US); Anita Eradla, McLean, VA (US); Scot Zola, Scottsdale, AZ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/100,341

(22) Filed: Nov. 20, 2020

(65) Prior Publication Data

US 2021/0250655 A1 Aug. 12, 2021

Related U.S. Application Data

(63) Continuation of application No. 13/826,090, filed on Mar. 14, 2013, now Pat. No. 10,880,609.

(51) Int. Cl.
*H04N 21/472* (2011.01)
*H04N 21/482* (2011.01)
(Continued)

(52) U.S. Cl.
CPC ... *H04N 21/47214* (2013.01); *H04N 21/2335* (2013.01); *H04N 21/23418* (2013.01);
(Continued)

(58) Field of Classification Search
None
See application file for complete search history.

(56) References Cited

U.S. PATENT DOCUMENTS

| 5,287,489 A | 2/1994 | Nimmo et al. |
| 5,321,750 A | 6/1994 | Nadan |

(Continued)

FOREIGN PATENT DOCUMENTS

| EP | 0624039 A2 | 11/1994 |
| EP | 0963115 A1 | 12/1999 |

(Continued)

OTHER PUBLICATIONS

Fernando Pereira, "The MPEG-4 Book", Prentice Hall, Jul. 10, 2002.

(Continued)

*Primary Examiner* — Samira Monshi
(74) *Attorney, Agent, or Firm* — Banner & Witcoff, Ltd.

(57) ABSTRACT

Methods, systems, computer readable media, and apparatuses are disclosed for providing event messages to a user. The event messages may include video data or a link to video of the event. In some variations, a user or content provider may define criteria for the event messages that are to be displayed to the user. The event messages may be stored so that a user may be able to browse through the stored event messages and decide when to view the video of the event. Upon a user's selection of the event message, the video of the event may be displayed to the user on the same display device or another display device.

20 Claims, 12 Drawing Sheets

(51) Int. Cl.
  *H04N 21/258*   (2011.01)
  *H04N 21/233*   (2011.01)
  *H04N 21/234*   (2011.01)
  *H04N 21/262*   (2011.01)

(52) U.S. Cl.
  CPC . *H04N 21/25891* (2013.01); *H04N 21/26291* (2013.01); *H04N 21/4826* (2013.01)

(56) References Cited

U.S. PATENT DOCUMENTS

| | | | |
|---|---|---|---|
| 5,353,121 A | 10/1994 | Young et al. |
| 5,485,221 A | 1/1996 | Banker et al. |
| 5,521,841 A | 5/1996 | Arman et al. |
| 5,530,939 A | 6/1996 | Mansfield, Jr. et al. |
| 5,583,563 A | 12/1996 | Wanderscheid et al. |
| 5,589,892 A | 12/1996 | Knee et al. |
| 5,592,551 A | 1/1997 | Lett et al. |
| 5,594,509 A | 1/1997 | Florin et al. |
| 5,613,057 A | 3/1997 | Caravel |
| 5,621,456 A | 4/1997 | Florin et al. |
| 5,657,072 A | 8/1997 | Aristides et al. |
| 5,659,793 A | 8/1997 | Escobar et al. |
| 5,666,645 A | 9/1997 | Thomas et al. |
| 5,675,752 A | 10/1997 | Scott et al. |
| 5,694,176 A | 12/1997 | Bruette et al. |
| 5,737,552 A | 4/1998 | Lavallee et al. |
| 5,802,284 A | 9/1998 | Karlton et al. |
| 5,826,102 A | 10/1998 | Escobar et al. |
| 5,844,620 A | 12/1998 | Coleman et al. |
| 5,850,218 A | 12/1998 | LaJoie et al. |
| 5,852,435 A | 12/1998 | Vigneaux et al. |
| 5,860,073 A | 1/1999 | Ferrel et al. |
| 5,883,677 A | 3/1999 | Hofmann |
| 5,892,902 A | 4/1999 | Clark |
| 5,892,905 A | 4/1999 | Brandt et al. |
| 5,905,492 A | 5/1999 | Straub et al. |
| 5,929,849 A | 7/1999 | Kikinis |
| 5,945,987 A | 8/1999 | Dunn |
| 5,960,194 A | 9/1999 | Choy et al. |
| 5,990,890 A | 11/1999 | Etheredge |
| 5,996,025 A | 11/1999 | Day et al. |
| 6,002,394 A | 12/1999 | Schein et al. |
| 6,005,561 A | 12/1999 | Hawkins et al. |
| 6,008,083 A | 12/1999 | Brabazon et al. |
| 6,008,803 A | 12/1999 | Rowe et al. |
| 6,008,836 A | 12/1999 | Bruck et al. |
| 6,016,144 A | 1/2000 | Blonstein et al. |
| 6,025,837 A | 2/2000 | Matthews, III et al. |
| 6,038,560 A | 3/2000 | Wical |
| 6,049,823 A | 4/2000 | Hwang |
| 6,061,695 A | 5/2000 | Slivka et al. |
| 6,067,108 A | 5/2000 | Yokote et al. |
| 6,088,722 A | 7/2000 | Herz et al. |
| 6,091,411 A | 7/2000 | Straub et al. |
| 6,094,237 A | 7/2000 | Hashimoto |
| 6,141,003 A | 10/2000 | Chor et al. |
| 6,148,081 A | 11/2000 | Szymanski et al. |
| 6,162,697 A | 12/2000 | Singh et al. |
| 6,169,543 B1 | 1/2001 | Wehmeyer |
| 6,172,677 B1 | 1/2001 | Stautner et al. |
| 6,177,931 B1 | 1/2001 | Alexander et al. |
| 6,191,781 B1 | 2/2001 | Chaney et al. |
| 6,195,692 B1 | 2/2001 | Hsu |
| 6,205,582 B1 | 3/2001 | Hoarty |
| 6,219,839 B1 | 4/2001 | Sampsell |
| 6,239,795 B1 | 5/2001 | Ulrich et al. |
| 6,240,555 B1 | 5/2001 | Shoff et al. |
| 6,281,940 B1 | 8/2001 | Sciammarella |
| 6,292,187 B1 | 9/2001 | Gibbs et al. |
| 6,292,827 B1 | 9/2001 | Raz |
| 6,295,057 B1 | 9/2001 | Rosin et al. |
| 6,314,569 B1 | 11/2001 | Chernock et al. |
| 6,317,885 B1 | 11/2001 | Fries |
| 6,345,305 B1 | 2/2002 | Beck et al. |
| 6,405,239 B1 | 6/2002 | Addington et al. |
| 6,415,438 B1 | 7/2002 | Blackketter et al. |
| 6,421,067 B1 | 7/2002 | Kamen et al. |
| 6,426,779 B1 | 7/2002 | Noguchi et al. |
| 6,442,755 B1 | 8/2002 | Lemmons et al. |
| 6,477,705 B1 | 11/2002 | Yuen et al. |
| 6,486,920 B2 | 11/2002 | Arai et al. |
| 6,522,342 B1 | 2/2003 | Gagnon et al. |
| 6,529,950 B1 | 3/2003 | Lumelsky et al. |
| 6,530,082 B1 | 3/2003 | Del Sesto et al. |
| 6,532,589 B1 | 3/2003 | Proehl et al. |
| 6,564,263 B1 | 5/2003 | Bergman et al. |
| 6,567,104 B1 | 5/2003 | Andrew et al. |
| 6,571,392 B1 | 5/2003 | Zigmond et al. |
| 6,591,292 B1 | 7/2003 | Morrison et al. |
| 6,621,509 B1 | 9/2003 | Eiref et al. |
| 6,636,887 B1 | 10/2003 | Augeri |
| 6,658,661 B1 | 12/2003 | Arsenault et al. |
| 6,678,891 B1 | 1/2004 | Wilcox et al. |
| 6,684,400 B1 | 1/2004 | Goode et al. |
| 6,694,312 B2 | 2/2004 | Kobayashi et al. |
| 6,698,020 B1 | 2/2004 | Zigmond et al. |
| 6,704,359 B1 | 3/2004 | Bayrakeri et al. |
| 6,731,310 B2 | 5/2004 | Craycroft et al. |
| 6,745,367 B1 | 6/2004 | Bates et al. |
| 6,760,043 B2 | 7/2004 | Markel |
| 6,763,522 B1 | 7/2004 | Kondo et al. |
| 6,766,526 B1 | 7/2004 | Ellis |
| 6,806,887 B2 | 10/2004 | Chernock et al. |
| 6,857,128 B1 | 2/2005 | Borden, IV et al. |
| 6,886,029 B1 | 4/2005 | Pecus et al. |
| 6,904,610 B1 | 6/2005 | Bayrakeri et al. |
| 6,910,191 B2 | 6/2005 | Segerberg et al. |
| 6,918,131 B1 | 7/2005 | Rautila et al. |
| 6,963,880 B1 | 11/2005 | Pingte et al. |
| 7,028,327 B1 | 4/2006 | Dougherty et al. |
| 7,065,785 B1 | 6/2006 | Shaffer et al. |
| 7,080,400 B1 | 7/2006 | Navar |
| 7,103,904 B1 | 9/2006 | Blackketter et al. |
| 7,114,170 B2 | 9/2006 | Harris et al. |
| 7,134,072 B1 | 11/2006 | Lovett et al. |
| 7,152,236 B1 | 12/2006 | Wugofski et al. |
| 7,162,694 B2 | 1/2007 | Venolia |
| 7,162,697 B2 | 1/2007 | Markel |
| 7,174,512 B2 | 2/2007 | Martin et al. |
| 7,177,861 B2 | 2/2007 | Tovinkere et al. |
| 7,197,715 B1 | 3/2007 | Valeria |
| 7,207,057 B1 | 4/2007 | Rowe |
| 7,213,005 B2 | 5/2007 | Mourad et al. |
| 7,221,801 B2 | 5/2007 | Jang et al. |
| 7,237,252 B2 | 6/2007 | Billmaier |
| 7,293,275 B1 | 11/2007 | Krieger et al. |
| 7,305,696 B2 | 12/2007 | Thomas et al. |
| 7,313,806 B1 | 12/2007 | Williams et al. |
| 7,337,457 B2 | 2/2008 | Pack et al. |
| 7,360,232 B2 | 4/2008 | Mitchell |
| 7,363,612 B2 | 4/2008 | Satuloori et al. |
| 7,406,705 B2 | 7/2008 | Crinon et al. |
| 7,440,967 B2 | 10/2008 | Chidlovskii |
| 7,464,344 B1 | 12/2008 | Carmichael et al. |
| 7,472,137 B2 | 12/2008 | Edelstein et al. |
| 7,490,092 B2 | 2/2009 | Sibley et al. |
| 7,516,468 B1 | 4/2009 | Deller et al. |
| 7,523,180 B1 | 4/2009 | DeLuca et al. |
| 7,587,415 B2 | 9/2009 | Gaurav et al. |
| 7,624,416 B1 | 11/2009 | Vandermolen et al. |
| 7,640,487 B2 | 12/2009 | Amielh-Caprioglio et al. |
| 7,702,315 B2 | 4/2010 | Engstrom et al. |
| 7,703,116 B1 | 4/2010 | Moreau et al. |
| 7,721,307 B2 | 5/2010 | Hendricks et al. |
| 7,743,330 B1 | 6/2010 | Hendricks et al. |
| 7,752,258 B2 | 7/2010 | Lewin et al. |
| 7,805,746 B2 | 9/2010 | Brandyberry et al. |
| 7,818,667 B2 | 10/2010 | Adams |
| 7,861,259 B2 | 12/2010 | Barone, Jr. |
| 7,913,286 B2 | 3/2011 | Sarachik et al. |
| 7,958,528 B2 | 6/2011 | Moreau et al. |
| 7,975,277 B1 | 7/2011 | Jerding et al. |
| 8,006,262 B2 | 8/2011 | Rodriguez et al. |

(56) References Cited

U.S. PATENT DOCUMENTS

| | | |
|---|---|---|
| 8,032,914 B2 | 10/2011 | Rodriguez |
| 8,042,132 B2 | 10/2011 | Carney et al. |
| 8,156,533 B2 | 4/2012 | Crichton |
| 8,220,018 B2 | 7/2012 | de Andrade et al. |
| 8,266,652 B2 | 9/2012 | Roberts et al. |
| 8,296,805 B2 | 10/2012 | Tabatabai et al. |
| 8,352,983 B1 | 1/2013 | Chane et al. |
| 8,365,230 B2 | 1/2013 | Chane et al. |
| 8,381,259 B1 | 2/2013 | Khosla |
| 8,413,205 B2 | 4/2013 | Carney et al. |
| 8,416,952 B1 | 4/2013 | Moreau et al. |
| 8,434,109 B2 | 4/2013 | Kamimaeda et al. |
| 8,448,208 B2 | 5/2013 | Moreau et al. |
| 8,578,411 B1 | 11/2013 | Carney et al. |
| 8,660,545 B1 | 2/2014 | Redford et al. |
| 8,699,862 B1 | 4/2014 | Sharifi et al. |
| 8,707,354 B1 | 4/2014 | Moreau et al. |
| 8,745,658 B2 | 6/2014 | Carney et al. |
| 8,756,634 B2 | 6/2014 | Chane et al. |
| 8,793,256 B2 | 7/2014 | McIntire et al. |
| 8,819,734 B2 | 8/2014 | Moreau et al. |
| 8,850,480 B2 | 9/2014 | Chane et al. |
| 8,850,495 B2 | 9/2014 | Pan |
| 8,863,196 B2 | 10/2014 | Patil et al. |
| 8,938,675 B2 | 1/2015 | Holladay et al. |
| 8,943,533 B2 | 1/2015 | de Andrade et al. |
| 8,973,063 B2 | 3/2015 | Spilo et al. |
| 9,021,528 B2 | 4/2015 | Moreau et al. |
| 9,197,938 B2 | 11/2015 | Chane et al. |
| 9,363,560 B2 | 6/2016 | Moreau et al. |
| 9,414,022 B2 | 8/2016 | Adams et al. |
| 9,451,196 B2 | 9/2016 | Carney et al. |
| 9,473,548 B1 | 10/2016 | Chakrovorthy et al. |
| 9,516,253 B2 | 12/2016 | de Andrade et al. |
| 9,553,927 B2 | 1/2017 | Sharma et al. |
| 9,729,924 B2 | 8/2017 | Moreau et al. |
| 9,967,611 B2 | 5/2018 | Andrade et al. |
| 9,992,546 B2 | 6/2018 | Moreau et al. |
| 10,110,973 B2 | 10/2018 | Adams |
| 10,149,014 B2 | 12/2018 | Chane et al. |
| 10,171,878 B2 | 1/2019 | Carney et al. |
| 10,237,617 B2 | 3/2019 | Moreau et al. |
| 10,491,942 B2 | 11/2019 | de Andrade et al. |
| 10,575,070 B2 | 2/2020 | Adams |
| 10,587,930 B2 | 3/2020 | Chane et al. |
| 10,602,225 B2 | 3/2020 | Carney et al. |
| 10,616,644 B2 | 4/2020 | Moreau et al. |
| 10,664,138 B2 | 5/2020 | Carney et al. |
| 10,687,114 B2 | 6/2020 | Carney et al. |
| 10,848,830 B2 | 11/2020 | Moreau et al. |
| 10,880,609 B2 | 12/2020 | Chipman et al. |
| 2001/0014206 A1 | 8/2001 | Artigalas et al. |
| 2001/0027563 A1 | 10/2001 | White et al. |
| 2001/0049823 A1 | 12/2001 | Matey |
| 2001/0056573 A1 | 12/2001 | Kovac et al. |
| 2001/0056577 A1 | 12/2001 | Gordon et al. |
| 2002/0010928 A1 | 1/2002 | Sahota |
| 2002/0016969 A1 | 2/2002 | Kimble |
| 2002/0023270 A1 | 2/2002 | Thomas et al. |
| 2002/0026642 A1 | 2/2002 | Augenbraun et al. |
| 2002/0032905 A1 | 3/2002 | Sherr et al. |
| 2002/0035573 A1 | 3/2002 | Black et al. |
| 2002/0041104 A1 | 4/2002 | Graf et al. |
| 2002/0042915 A1 | 4/2002 | Kubischta et al. |
| 2002/0042920 A1 | 4/2002 | Thomas et al. |
| 2002/0046099 A1 | 4/2002 | Frengut et al. |
| 2002/0059094 A1 | 5/2002 | Hosea et al. |
| 2002/0059586 A1 | 5/2002 | Carney et al. |
| 2002/0059629 A1 | 5/2002 | Markel |
| 2002/0067376 A1 | 6/2002 | Martin et al. |
| 2002/0069407 A1 | 6/2002 | Fagnani et al. |
| 2002/0070978 A1 | 6/2002 | Wishoff et al. |
| 2002/0078444 A1 | 6/2002 | Krewin et al. |
| 2002/0078449 A1 | 6/2002 | Gordon et al. |
| 2002/0083450 A1 | 6/2002 | Kamen et al. |
| 2002/0100041 A1 | 7/2002 | Rosenberg et al. |
| 2002/0104083 A1 | 8/2002 | Hendricks et al. |
| 2002/0107973 A1 | 8/2002 | Lennon et al. |
| 2002/0108121 A1 | 8/2002 | Alao et al. |
| 2002/0108122 A1 | 8/2002 | Alao et al. |
| 2002/0120609 A1 | 8/2002 | Lang et al. |
| 2002/0124254 A1 | 9/2002 | Kikinis |
| 2002/0124256 A1 | 9/2002 | Suzuka |
| 2002/0144268 A1 | 10/2002 | Khoo et al. |
| 2002/0144269 A1 | 10/2002 | Connelly |
| 2002/0144273 A1 | 10/2002 | Reto |
| 2002/0147645 A1 | 10/2002 | Alao et al. |
| 2002/0152477 A1 | 10/2002 | Goodman et al. |
| 2002/0156839 A1 | 10/2002 | Peterson et al. |
| 2002/0156890 A1 | 10/2002 | Carlyle et al. |
| 2002/0162120 A1 | 10/2002 | Mitchell |
| 2002/0169885 A1 | 11/2002 | Alao et al. |
| 2002/0170059 A1 | 11/2002 | Hoang |
| 2002/0171691 A1 | 11/2002 | Currans et al. |
| 2002/0171940 A1 | 11/2002 | He et al. |
| 2002/0184629 A1 | 12/2002 | Sie et al. |
| 2002/0188944 A1 | 12/2002 | Noble |
| 2002/0194181 A1 | 12/2002 | Wachtel |
| 2002/0196268 A1 | 12/2002 | Wolff et al. |
| 2002/0199187 A1 | 12/2002 | Gissin et al. |
| 2002/0199190 A1 | 12/2002 | Su |
| 2003/0001880 A1 | 1/2003 | Holtz et al. |
| 2003/0005444 A1 | 1/2003 | Crinon et al. |
| 2003/0005453 A1 | 1/2003 | Rodriguez et al. |
| 2003/0014752 A1 | 1/2003 | Zaslavsky et al. |
| 2003/0014753 A1 | 1/2003 | Beach et al. |
| 2003/0018755 A1 | 1/2003 | Masterson et al. |
| 2003/0023970 A1 | 1/2003 | Panabaker |
| 2003/0023975 A1 | 1/2003 | Schrader et al. |
| 2003/0025832 A1 | 2/2003 | Swart et al. |
| 2003/0028871 A1 | 2/2003 | Wang et al. |
| 2003/0028873 A1 | 2/2003 | Lemmons |
| 2003/0041104 A1 | 2/2003 | Wingard et al. |
| 2003/0051246 A1 | 3/2003 | Wilder et al. |
| 2003/0056216 A1 | 3/2003 | Wugofski et al. |
| 2003/0056218 A1 | 3/2003 | Wingard et al. |
| 2003/0058948 A1 | 3/2003 | Kelly et al. |
| 2003/0061028 A1 | 3/2003 | Dey et al. |
| 2003/0066081 A1 | 4/2003 | Barone et al. |
| 2003/0067554 A1 | 4/2003 | Klarfeld et al. |
| 2003/0068046 A1 | 4/2003 | Lindqvist et al. |
| 2003/0070170 A1 | 4/2003 | Lennon |
| 2003/0079226 A1 | 4/2003 | Barrett |
| 2003/0084443 A1 | 5/2003 | Laughlin et al. |
| 2003/0084444 A1 | 5/2003 | Ullman et al. |
| 2003/0084449 A1 | 5/2003 | Chane et al. |
| 2003/0086694 A1 | 5/2003 | Davidsson |
| 2003/0093790 A1 | 5/2003 | Logan et al. |
| 2003/0093792 A1 | 5/2003 | Labeeb et al. |
| 2003/0097657 A1 | 5/2003 | Zhou et al. |
| 2003/0110500 A1 | 6/2003 | Rodriguez |
| 2003/0110503 A1 | 6/2003 | Perkes |
| 2003/0115219 A1 | 6/2003 | Chadwick |
| 2003/0115612 A1 | 6/2003 | Mao et al. |
| 2003/0126601 A1 | 7/2003 | Roberts et al. |
| 2003/0132971 A1 | 7/2003 | Billmaier et al. |
| 2003/0135464 A1 | 7/2003 | Mourad et al. |
| 2003/0135582 A1 | 7/2003 | Allen et al. |
| 2003/0140097 A1 | 7/2003 | Schloer |
| 2003/0151621 A1 | 8/2003 | McEvilly et al. |
| 2003/0158777 A1 | 8/2003 | Schiff et al. |
| 2003/0172370 A1 | 9/2003 | Satuloori et al. |
| 2003/0177501 A1 | 9/2003 | Takahashi et al. |
| 2003/0182663 A1 | 9/2003 | Gudorf et al. |
| 2003/0189668 A1 | 10/2003 | Newnam et al. |
| 2003/0204814 A1 | 10/2003 | Elo et al. |
| 2003/0204846 A1 | 10/2003 | Breen et al. |
| 2003/0204854 A1 | 10/2003 | Blackketter et al. |
| 2003/0207696 A1 | 11/2003 | Willenegger et al. |
| 2003/0226141 A1 | 12/2003 | Krasnow et al. |
| 2003/0229899 A1 | 12/2003 | Thompson et al. |
| 2004/0003402 A1 | 1/2004 | McKenna |
| 2004/0003404 A1 | 1/2004 | Boston et al. |
| 2004/0019900 A1 | 1/2004 | Knightbridge et al. |

(56) References Cited

U.S. PATENT DOCUMENTS

| | | |
|---|---|---|
| 2004/0019908 A1 | 1/2004 | Williams et al. |
| 2004/0022271 A1 | 2/2004 | Fichet et al. |
| 2004/0024753 A1 | 2/2004 | Chane et al. |
| 2004/0025180 A1 | 2/2004 | Begeja et al. |
| 2004/0031015 A1 | 2/2004 | Ben-Romdhane et al. |
| 2004/0031058 A1 | 2/2004 | Reisman |
| 2004/0031062 A1 | 2/2004 | Lemmons |
| 2004/0039754 A1 | 2/2004 | Harple |
| 2004/0073915 A1 | 4/2004 | Dureau |
| 2004/0078814 A1 | 4/2004 | Allen |
| 2004/0107437 A1 | 6/2004 | Reichardt et al. |
| 2004/0107439 A1 | 6/2004 | Hassell et al. |
| 2004/0111465 A1 | 6/2004 | Chuang et al. |
| 2004/0128699 A1 | 7/2004 | Delpuch et al. |
| 2004/0133923 A1 | 7/2004 | Watson et al. |
| 2004/0136698 A1 | 7/2004 | Mock |
| 2004/0168186 A1 | 8/2004 | Rector et al. |
| 2004/0172648 A1 | 9/2004 | Xu et al. |
| 2004/0189658 A1 | 9/2004 | Dowdy |
| 2004/0194136 A1 | 9/2004 | Finseth et al. |
| 2004/0199578 A1 | 10/2004 | Kapczynski et al. |
| 2004/0221306 A1 | 11/2004 | Noh |
| 2004/0224723 A1 | 11/2004 | Farcasiu |
| 2004/0225751 A1 | 11/2004 | Urali |
| 2004/0226051 A1 | 11/2004 | Carney et al. |
| 2005/0005288 A1 | 1/2005 | Novak |
| 2005/0015796 A1 | 1/2005 | Bruckner et al. |
| 2005/0015804 A1 | 1/2005 | LaJoie et al. |
| 2005/0028208 A1 | 2/2005 | Ellis et al. |
| 2005/0086172 A1 | 4/2005 | Stefik |
| 2005/0125835 A1 | 6/2005 | Wei |
| 2005/0149972 A1 | 7/2005 | Knudson |
| 2005/0155063 A1 | 7/2005 | Bayrakeri et al. |
| 2005/0160458 A1 | 7/2005 | Baumgartner |
| 2005/0166230 A1 | 7/2005 | Gaydou et al. |
| 2005/0204385 A1 | 9/2005 | Sull et al. |
| 2005/0259147 A1 | 11/2005 | Nam et al. |
| 2005/0262542 A1 | 11/2005 | DeWeese et al. |
| 2005/0283800 A1 | 12/2005 | Ellis et al. |
| 2005/0287948 A1 | 12/2005 | Hellwagner et al. |
| 2006/0004743 A1 | 1/2006 | Murao et al. |
| 2006/0059525 A1 | 3/2006 | Jerding et al. |
| 2006/0068818 A1 | 3/2006 | Leitersdorf et al. |
| 2006/0080707 A1 | 4/2006 | Laksono |
| 2006/0080716 A1 | 4/2006 | Nishikawa et al. |
| 2006/0104511 A1 | 5/2006 | Guo et al. |
| 2006/0105793 A1 | 5/2006 | Gutowski et al. |
| 2006/0125962 A1 | 6/2006 | Shelton et al. |
| 2006/0143191 A1 | 6/2006 | Cho et al. |
| 2006/0156336 A1 | 7/2006 | Knudson et al. |
| 2006/0195865 A1 | 8/2006 | Fablet |
| 2006/0200842 A1* | 9/2006 | Chapman ............ H04N 21/4882 725/34 |
| 2006/0206470 A1 | 9/2006 | McIntyre |
| 2006/0206912 A1 | 9/2006 | Klarfeld et al. |
| 2006/0233514 A1 | 10/2006 | Weng et al. |
| 2006/0248572 A1 | 11/2006 | Kitsukama et al. |
| 2007/0019001 A1 | 1/2007 | Ha |
| 2007/0050343 A1 | 3/2007 | Siddaramappa et al. |
| 2007/0064715 A1 | 3/2007 | Lloyd et al. |
| 2007/0083538 A1 | 4/2007 | Roy et al. |
| 2007/0112761 A1 | 5/2007 | Xu et al. |
| 2007/0157247 A1 | 7/2007 | Cordray et al. |
| 2007/0211762 A1 | 9/2007 | Song et al. |
| 2007/0214123 A1 | 9/2007 | Messer et al. |
| 2007/0214488 A1 | 9/2007 | Nguyen et al. |
| 2007/0220016 A1 | 9/2007 | Estrada et al. |
| 2007/0239707 A1 | 10/2007 | Collins et al. |
| 2007/0250901 A1 | 10/2007 | McIntire et al. |
| 2007/0260700 A1 | 11/2007 | Messer |
| 2007/0261072 A1 | 11/2007 | Boulet et al. |
| 2007/0271587 A1 | 11/2007 | Rowe |
| 2008/0037722 A1 | 2/2008 | Klassen |
| 2008/0060011 A1 | 3/2008 | Kelts |
| 2008/0071770 A1 | 3/2008 | Schloter et al. |
| 2008/0092201 A1 | 4/2008 | Agarwal et al. |
| 2008/0113504 A1 | 5/2008 | Lee et al. |
| 2008/0126109 A1 | 5/2008 | Cragun et al. |
| 2008/0133504 A1 | 6/2008 | Messer et al. |
| 2008/0148317 A1 | 6/2008 | Opaluch |
| 2008/0163304 A1 | 7/2008 | Ellis |
| 2008/0183681 A1 | 7/2008 | Messer et al. |
| 2008/0183698 A1 | 7/2008 | Messer et al. |
| 2008/0189740 A1 | 8/2008 | Carpenter et al. |
| 2008/0196070 A1 | 8/2008 | White et al. |
| 2008/0204595 A1 | 8/2008 | Rathod et al. |
| 2008/0208796 A1 | 8/2008 | Messer et al. |
| 2008/0208839 A1 | 8/2008 | Sheshagiri et al. |
| 2008/0221989 A1 | 9/2008 | Messer et al. |
| 2008/0235209 A1 | 9/2008 | Rathod et al. |
| 2008/0235393 A1 | 9/2008 | Kunjithapatham et al. |
| 2008/0235725 A1 | 9/2008 | Hendricks |
| 2008/0250010 A1 | 10/2008 | Rathod et al. |
| 2008/0256097 A1 | 10/2008 | Messer et al. |
| 2008/0266449 A1 | 10/2008 | Rathod et al. |
| 2008/0276278 A1 | 11/2008 | Krieger et al. |
| 2008/0282294 A1 | 11/2008 | Carpenter et al. |
| 2008/0288641 A1 | 11/2008 | Messer et al. |
| 2008/0288644 A1 | 11/2008 | Gilfix et al. |
| 2008/0301320 A1 | 12/2008 | Morris |
| 2008/0301732 A1 | 12/2008 | Archer et al. |
| 2008/0317233 A1 | 12/2008 | Rey et al. |
| 2009/0006315 A1 | 1/2009 | Mukherjea et al. |
| 2009/0019485 A1 | 1/2009 | Ellis et al. |
| 2009/0024629 A1 | 1/2009 | Miyauchi |
| 2009/0025054 A1 | 1/2009 | Gibbs et al. |
| 2009/0083257 A1 | 3/2009 | Bargeron et al. |
| 2009/0094113 A1 | 4/2009 | Berry et al. |
| 2009/0094632 A1 | 4/2009 | Newnam et al. |
| 2009/0094651 A1 | 4/2009 | Damm et al. |
| 2009/0123021 A1 | 5/2009 | Jung et al. |
| 2009/0133025 A1 | 5/2009 | Malhotra et al. |
| 2009/0164904 A1 | 6/2009 | Horowitz et al. |
| 2009/0183210 A1 | 7/2009 | Andrade |
| 2009/0222872 A1 | 9/2009 | Schlack |
| 2009/0228441 A1 | 9/2009 | Sandvik |
| 2009/0240650 A1 | 9/2009 | Wang et al. |
| 2009/0249427 A1 | 10/2009 | Dunnigan et al. |
| 2009/0271829 A1 | 10/2009 | Larsson et al. |
| 2009/0288132 A1* | 11/2009 | Hegde ................ H04N 21/4316 725/141 |
| 2009/0292548 A1 | 11/2009 | Van Court |
| 2010/0023966 A1 | 1/2010 | Shahraray et al. |
| 2010/0077057 A1 | 3/2010 | Godin et al. |
| 2010/0079670 A1 | 4/2010 | Frazier et al. |
| 2010/0175084 A1 | 7/2010 | Ellis et al. |
| 2010/0180300 A1 | 7/2010 | Carpenter et al. |
| 2010/0223640 A1 | 9/2010 | Reichardt et al. |
| 2010/0250190 A1 | 9/2010 | Zhang et al. |
| 2010/0251284 A1 | 9/2010 | Ellis et al. |
| 2010/0257548 A1 | 10/2010 | Lee et al. |
| 2011/0055282 A1 | 3/2011 | Hoving |
| 2011/0058101 A1 | 3/2011 | Earley et al. |
| 2011/0087348 A1 | 4/2011 | Wong |
| 2011/0093909 A1 | 4/2011 | Roberts et al. |
| 2011/0131204 A1 | 6/2011 | Bodin et al. |
| 2011/0176787 A1 | 7/2011 | DeCamp |
| 2011/0209180 A1 | 8/2011 | Ellis et al. |
| 2011/0211813 A1 | 9/2011 | Marks |
| 2011/0214143 A1 | 9/2011 | Rits et al. |
| 2011/0219386 A1 | 9/2011 | Hwang et al. |
| 2011/0219419 A1 | 9/2011 | Reisman |
| 2011/0225417 A1 | 9/2011 | Maharajh et al. |
| 2011/0246495 A1 | 10/2011 | Mallinson |
| 2011/0247042 A1 | 10/2011 | Mallinson |
| 2012/0002111 A1 | 1/2012 | Sandoval et al. |
| 2012/0011550 A1 | 1/2012 | Holland |
| 2012/0054811 A1 | 3/2012 | Spears |
| 2012/0066602 A1 | 3/2012 | Chai et al. |
| 2012/0117151 A1 | 5/2012 | Bill |
| 2012/0185905 A1 | 7/2012 | Kelley |
| 2012/0192226 A1 | 7/2012 | Zimmerman et al. |
| 2012/0227073 A1 | 9/2012 | Hosein et al. |
| 2012/0233646 A1 | 9/2012 | Coniglio et al. |

(56) References Cited

U.S. PATENT DOCUMENTS

| | | |
|---|---|---|
| 2012/0295686 A1 | 11/2012 | Lockton |
| 2012/0324002 A1 | 12/2012 | Chen |
| 2012/0324494 A1 | 12/2012 | Burger et al. |
| 2012/0324495 A1 | 12/2012 | Matthews, III et al. |
| 2012/0324518 A1 | 12/2012 | Thomas et al. |
| 2013/0014155 A1 | 1/2013 | Clarke et al. |
| 2013/0040623 A1 | 2/2013 | Chun et al. |
| 2013/0051770 A1 | 2/2013 | Sargent |
| 2013/0103446 A1 | 4/2013 | Bragdon et al. |
| 2013/0110769 A1 | 5/2013 | Ito |
| 2013/0111514 A1 | 5/2013 | Slavin et al. |
| 2013/0170813 A1 | 7/2013 | Woods et al. |
| 2013/0176493 A1 | 7/2013 | Khosla |
| 2013/0198642 A1 | 8/2013 | Carney et al. |
| 2013/0262997 A1 | 10/2013 | Markworth et al. |
| 2013/0298038 A1 | 11/2013 | Spivack et al. |
| 2013/0316716 A1 | 11/2013 | Tapia et al. |
| 2013/0326570 A1 | 12/2013 | Cowper et al. |
| 2013/0332839 A1 | 12/2013 | Frazier et al. |
| 2013/0332852 A1 | 12/2013 | Castanho et al. |
| 2013/0332855 A1 | 12/2013 | Roman et al. |
| 2013/0347018 A1 | 12/2013 | Limp et al. |
| 2013/0347030 A1 | 12/2013 | Oh et al. |
| 2014/0006951 A1 | 1/2014 | Hunter |
| 2014/0009680 A1 | 1/2014 | Moon et al. |
| 2014/0026068 A1 | 1/2014 | Park et al. |
| 2014/0032473 A1 | 1/2014 | Enoki et al. |
| 2014/0053078 A1 | 2/2014 | Kannan |
| 2014/0068648 A1 | 3/2014 | Green et al. |
| 2014/0075465 A1 | 3/2014 | Petrovic et al. |
| 2014/0089423 A1 | 3/2014 | Jackels |
| 2014/0089967 A1 | 3/2014 | Mandalia et al. |
| 2014/0129570 A1 | 5/2014 | Johnson |
| 2014/0149918 A1 | 5/2014 | Asokan et al. |
| 2014/0150022 A1 | 5/2014 | Oh et al. |
| 2014/0237498 A1 | 8/2014 | Ivins |
| 2014/0267931 A1 | 9/2014 | Gilson et al. |
| 2014/0279852 A1 | 9/2014 | Chen |
| 2014/0280695 A1 | 9/2014 | Sharma et al. |
| 2014/0282122 A1 | 9/2014 | Mathur |
| 2014/0325359 A1 | 10/2014 | Vehovsky et al. |
| 2014/0327677 A1 | 11/2014 | Walker |
| 2014/0334381 A1 | 11/2014 | Subramaniam et al. |
| 2014/0359662 A1 | 12/2014 | Packard et al. |
| 2014/0365302 A1 | 12/2014 | Walker |
| 2014/0373032 A1 | 12/2014 | Merry et al. |
| 2015/0020096 A1 | 1/2015 | Walker |
| 2015/0026743 A1 | 1/2015 | Kim et al. |
| 2015/0263923 A1 | 9/2015 | Kruglick |

FOREIGN PATENT DOCUMENTS

| | | | |
|---|---|---|---|
| EP | 1058999 A1 | | 12/2000 |
| EP | 1080582 A1 | | 3/2001 |
| GB | 2323489 A | | 9/1998 |
| GB | 2448874 A | | 11/2008 |
| GB | 2448875 A | | 11/2008 |
| WO | 9963757 A1 | | 12/1999 |
| WO | 2000011869 A1 | | 3/2000 |
| WO | 0033576 A1 | | 6/2000 |
| WO | 0110115 A1 | | 2/2001 |
| WO | 0182613 A1 | | 11/2001 |
| WO | 2001084830 A1 | | 11/2001 |
| WO | 02063426 A2 | | 8/2002 |
| WO | 02063471 A2 | | 8/2002 |
| WO | 02063851 A2 | | 8/2002 |
| WO | 02063878 A2 | | 8/2002 |
| WO | 03009126 A1 | | 1/2003 |
| WO | 2003/026275 A2 | | 3/2003 |
| WO | 2007115224 A2 | | 10/2007 |
| WO | 2008053132 A1 | | 5/2008 |
| WO | 2011/053271 A1 | | 5/2011 |
| WO | 2012/094105 A1 | | 7/2012 |
| WO | 2012/154541 A1 | | 11/2012 |

OTHER PUBLICATIONS

Michael Adams, "Open Cable Architecture", Cisco Press, Dec. 3, 1999.
Andreas Kraft and Klaus Hofrichter, "An Approach for Script-Based Broadcast Application Production", Springer-Verlag Berlin Heidelberg, pp. 74-82, 1999.
Mark Riehl, "XML and Perl", Sams, Oct. 16, 2002.
MetaTV, Inc., PCT/US02/29917 filed Sep. 19, 2002, International Search Report dated Apr. 14, 2003; ISA/US; 6 pages.
Sylvain Devillers, "Bitstream Syntax Definition Language: an Input to MPEG-21 Content Representation", Mar. 2001, ISO, ISO/IEC JTC1/SC29/WG11 MPEG01/M7053.
Shim, et al., "A SMIL Based Graphical Interface for Interactive TV", Internet Tech. Laboratory Dept. of Comp. Engineering, San Jose State University, pp. 257-266, 2003.
Yoon, et al., "Video Gadget: MPET-7 Based Audio-Visual Content Indexing and Browsing Engine", LG Electronics Institute of Technology, 2001, pp. 59-68.
Watchwith webpage; http://www.watchwith.com/content_owners/watchwith_plalform_components.jsp (last visited Mar. 12, 2013).
Matt Duffy; TVplus App reveals content click-through rates north of 10% across sync enabled programming; http://www.tvplus.com/blog/TVplus-App-reveals-content-click-through-rates-north-of-10-Percent-across-sync-enabled-programming (retrieved from the Wayback Machine on Mar. 12, 2013).
"In Time for Academy Awards Telecast, Companion TV App Umami Debuts First Real-Time Sharing of a TV Program's Images"; Umami News; http:www.umami.tv/2012-02-23.html (retrieved from the Wayback Machine on Mar. 12, 2013).
European Patent Application No. 09175979.5—Office Action dated Dec. 13, 2011.
Canadian Patent Application No. 2,685,833—Office Action dated Jan. 20, 2012.
Li, Y. et al. "Reliable Video Clock Time Recognition", Pattern Recognition, 2006, 1CPR 1006, 18th International Conference on Pattern Recognition, 4 pages.
European Search Report dated Mar. 1, 2010.
Salton et al., Computer Evaluation of Indexing and Text Processing Journal of the Association for Computing Machinery, vol. 15, No. 1, Jan. 1968, pp. 8-36.
Smith, J.R. et al., An Image and Video Search Engine for the World-Wide Web Storage and Retrieval for Image and Video Databases 5, San Jose, Feb. 13-14, 1997, Proceedings of Spie, Bellingham, Spie, US, vol. 3022, Feb. 13, 1997, pp. 84-95.
Kontothoanassis, Ledonias et al. "Design, Implementation, and Analysis of a Multimedia Indexing and Delivery Server", Technical Report Series, Aug. 1999, Cambridge Research Laboratory.
Messer, Alan et al., "SeeNSearch: A context Directed Search Facilitator for Home Entertainment Devices", Paper, Samsung Information Systems America Inc., San Jose, CA, 2008.
Boulgouris N. V. et al., "Real-Time Compressed-Domain Spatiotemporal Segmentation and Ontologies for Video Indexing and Retrieval", IEEE Transactions on Circuits and Systems for Video Technology, vol. 14, No. 5, pp. 606-621, May 2004.
Changsheng Xu et al., "Using Webcast Text for Semantic Event Detection in Broadcast Sports Video", IEEE Transactions on Multimedia, vol. 10, No. 7, pp. 1342-1355, Nov. 2008.
Liang Bai et al., "Video Semantic Content Analysis based on Ontology", International Machine Vision and Image Processing Conference, pp. 117-124, Sep. 2007.
Koskela M. et al., "Measuring Concept Similarities in Multimedia Ontologies: Analysis and Evaluations", IEEE Transactions on Multimedia, vol. 9, No. 5, pp. 912-922, Aug. 2007.
Steffan Staab et al., "Semantic Multimedia", Reasoning Web; Lecture Notes in Computer Science, pp. 125-170, Sep. 2008.
European Search Report for Application No. 09180776.8, dated Jun. 7, 2010, 9 pages.
European Search Report, EP 09 18 0762, completion date Mar. 22, 2010.
European Search Report dated Jun. 4, 2010.
EP Application No. 09 179 987.4-1241—Office Action dated Feb. 15, 2011.

(56) References Cited

OTHER PUBLICATIONS

European Application No. 09 175 979.5—Office Action dated Apr. 11, 2011.
Boronat F et al: "Multimedia group and inter-stream synchronization techniques: A comparative study", Information Systems. Pergamon Press. Oxford. GB. vol. 34. No. 1. Mar. 1, 2009 (Mar. 1, 2009). pp. 108-131. XP025644936.
Extended European Search Report—EP14159227.9—dated Sep. 3, 2014.
Canadian Office Action—CA 2,685,833—dated Jan. 22, 2015.
European Extended Search Report—EP 13192112.4—dated May 11, 2015.
CA Response to Office Action—CA Appl. 2,685,833—Submitted Jul. 17, 2015.
Response to European Office Action—European Appl. 13192112.4—submitted Dec. 9, 2015.
CA Office Action—CA App 2,685,833—dated Jan. 27, 2016.
European Office Action—EP App 14159227.9—dated Jul. 12, 2016.
Agnieszka Zagozdzinnska et al. "TRIDAQ Systems in HEP Experiments at LHC Accelerator" Kwartalnik Elektroniki I Telekomunikacji, vol. 59, No. 4, Oct. 2013.
CA Office Action—CA Application 2685833—dated Feb. 8, 2017.
Nov. 29, 2017—Canadian Office Action—CA 2,685,833.
Feb. 19, 2018—European Summons to Oral Proceedings—EP 14159227.9.
Mar. 9, 2018—European Office Action—EP 13192112.4.
Jul. 31, 2018—European Decision to Refuse—14159227.9.
Sep. 5, 2019—Canadian Office Action—CA 2,685,833.
Nov. 6, 2019—Canadian Office Action—CA 2,832,800.
Apr. 21, 2020—European Summons to Oral Proceedings—EP 09175979.5.
Aug. 24, 2020, Canadian Office Action, CA 2,832,800.
U.S. Appl. No. 10/306,752, Broadcast Database, filed Nov. 27, 2002.
U.S. Appl. No. 10/635,799, User Customization of User Interfaces for Interactive Television, filed Aug. 5, 2003.
U.S. Appl. No. 12/274,452, Method and Apparatus for Delivering Video and Video Related Content as Sub-Asset Level, filed Nov. 20, 2008.
U.S. Appl. No. 13/671,626, Crowdsourcing Supplemental Content, filed Nov. 8, 2012.
U.S. Appl. No. 14/520,819, Systems and Methods for Curating Content Metadata, filed Oct. 22, 2014.
U.S. Appl. No. 14/842,196, System and Method for Construction, Delivery and Display of iTV Content, filed Sep. 1, 2015.
U.S. Appl. No. 16/740,921, Validation of Content, filed Jan. 13, 2020.
U.S. Appl. No. 16/746,111, System and Method for Blending Linear Content, Non-Linear Content, or Managed Content, filed Jan. 17, 2020.
U.S. Appl. No. 16/851,814, Providing Supplemental Content for a Second Screen Experience, filed Apr. 17, 2020.
U.S. Appl. No. 17/076,446, Contextual Navigational Control for Digital Television, filed Oct. 21, 2020.

\* cited by examiner

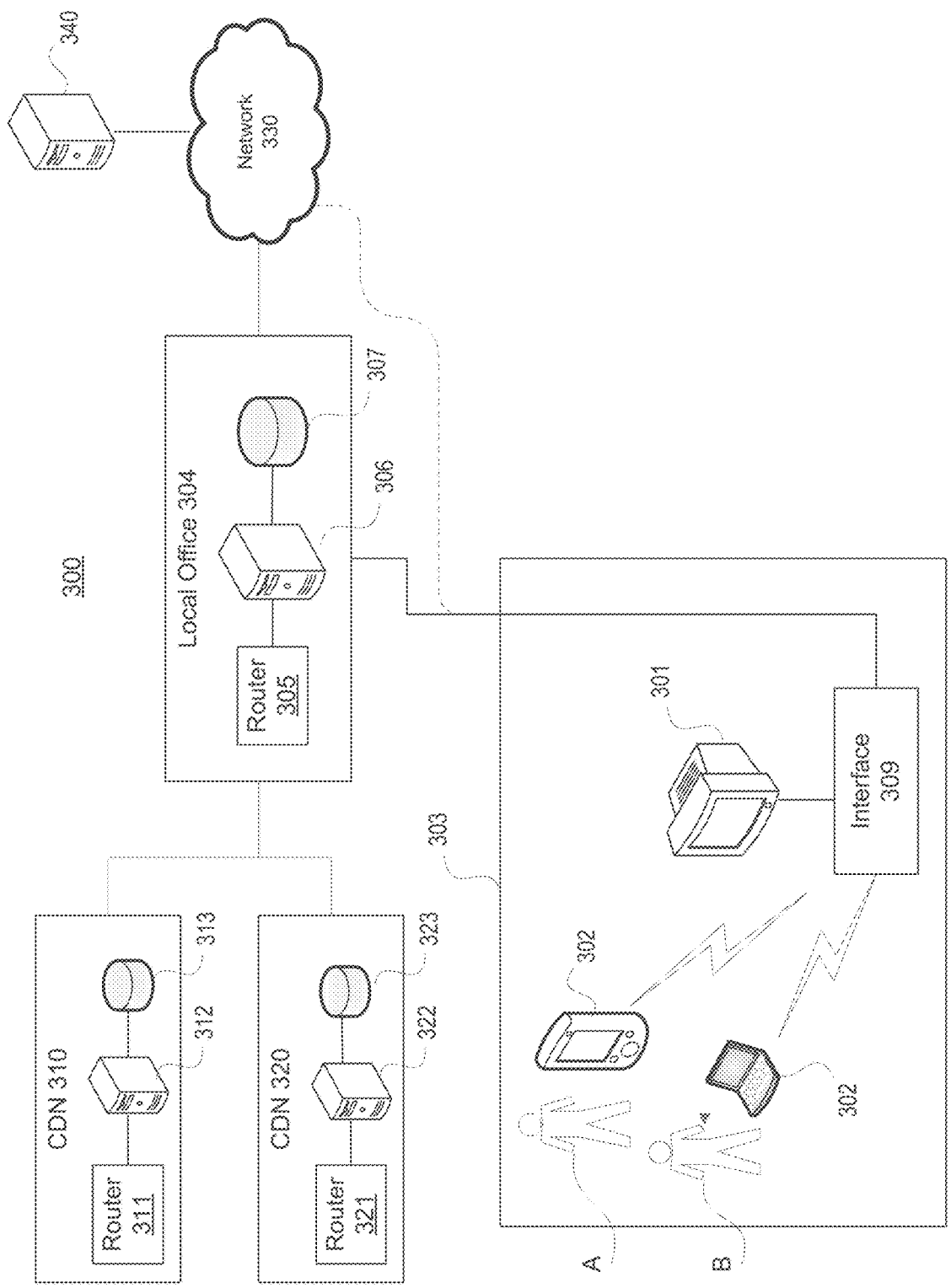

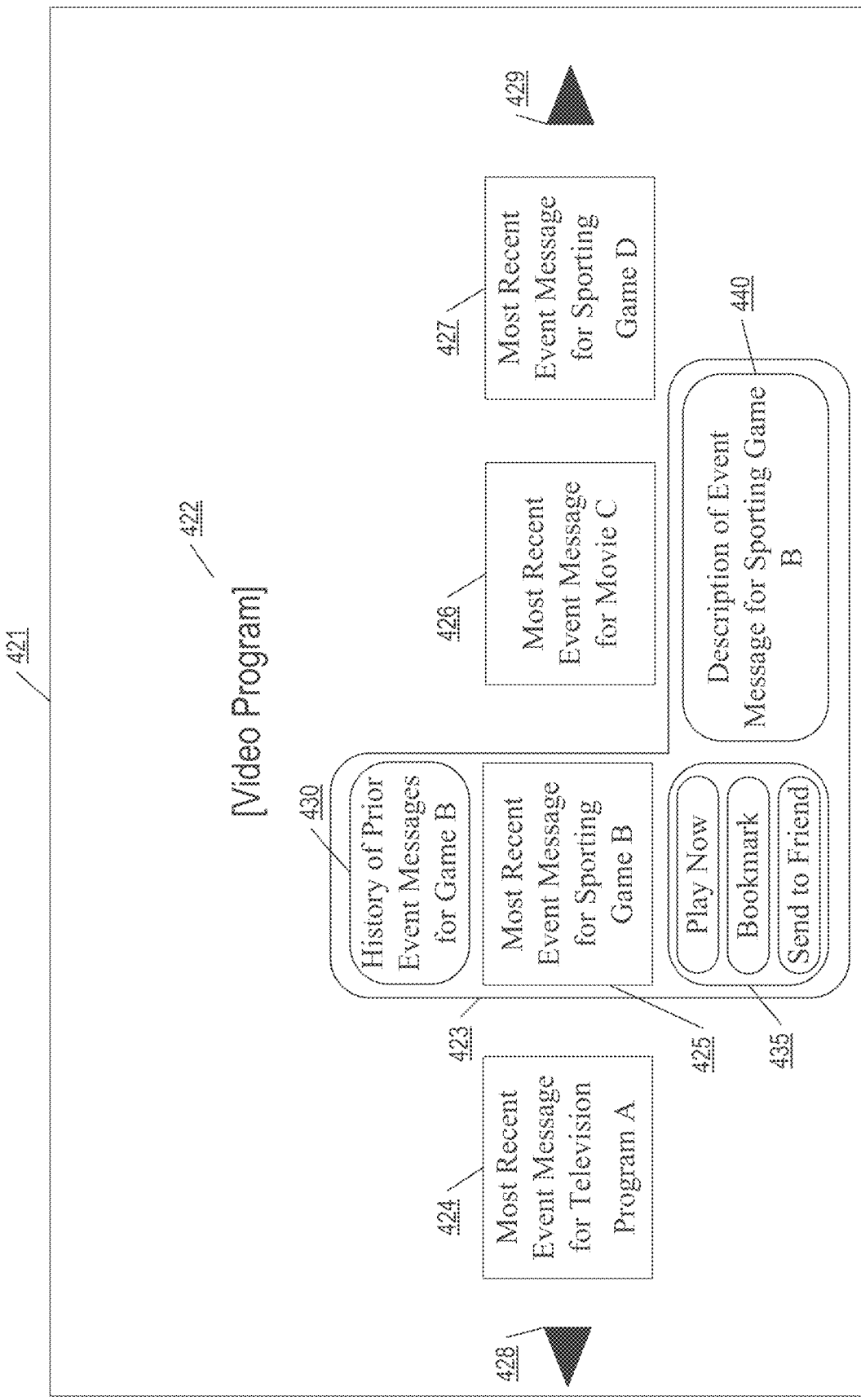

FIG. 5A (Both First Screen Device and Second Screen Device)
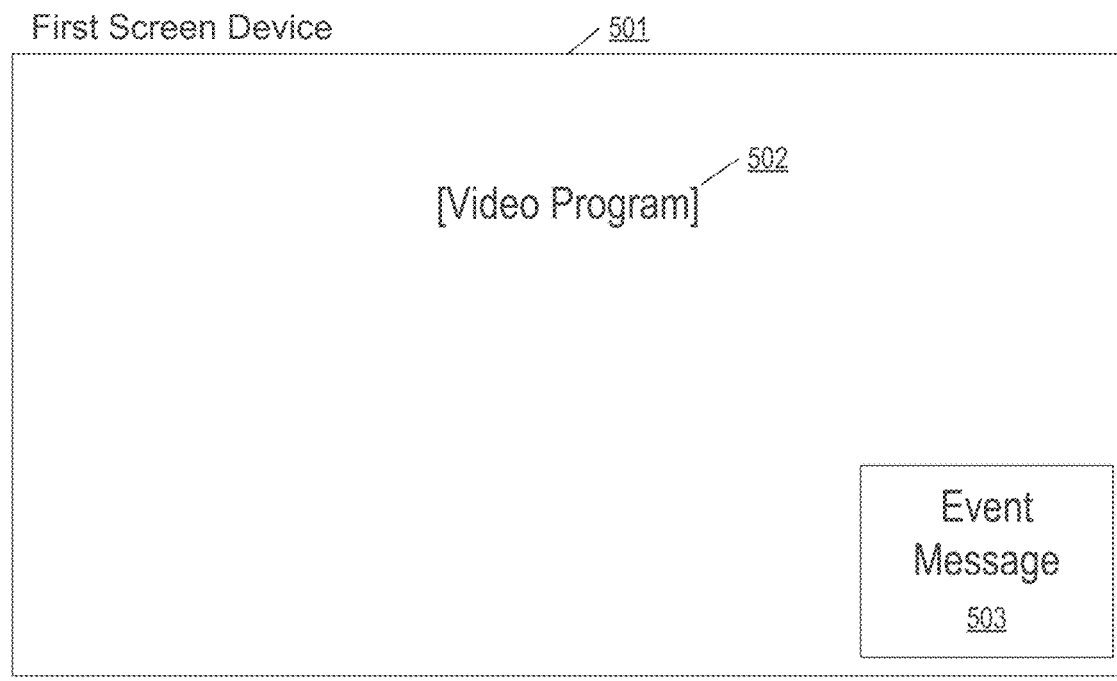
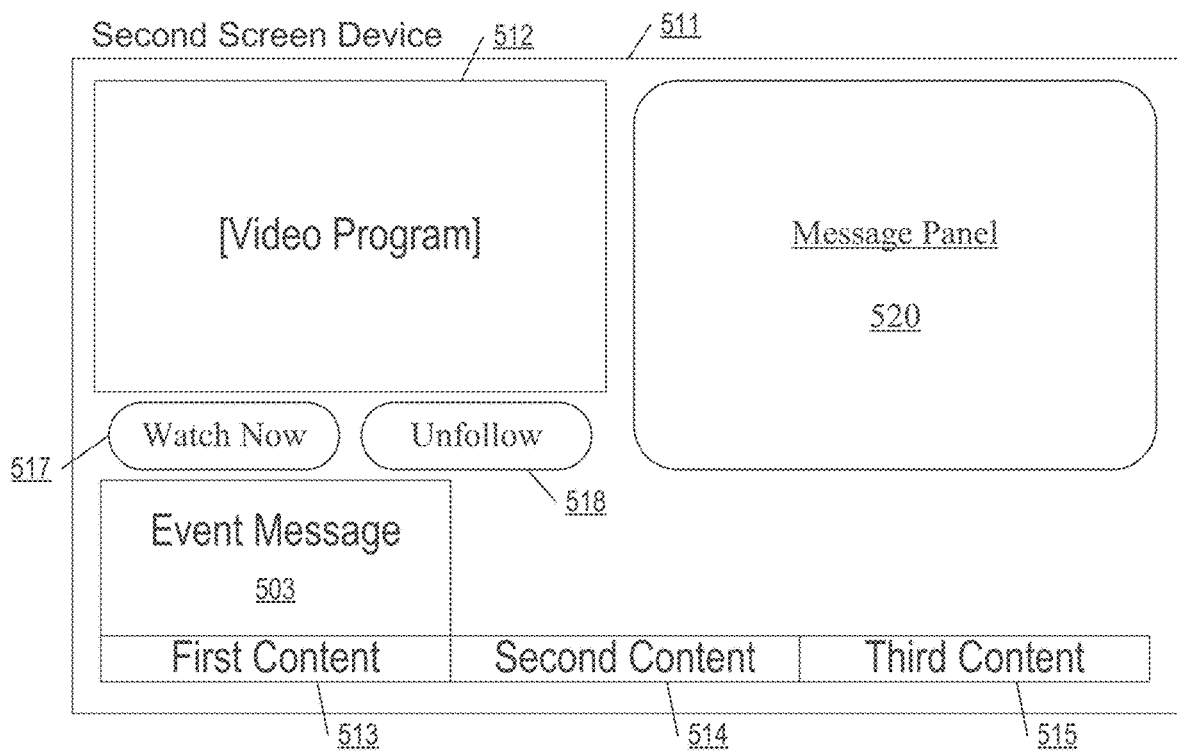

Fig. 5B (Both First Screen Device and Second Screen Device)
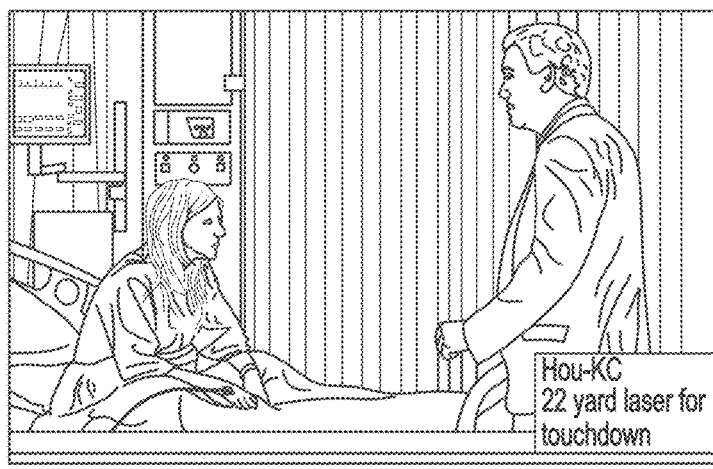
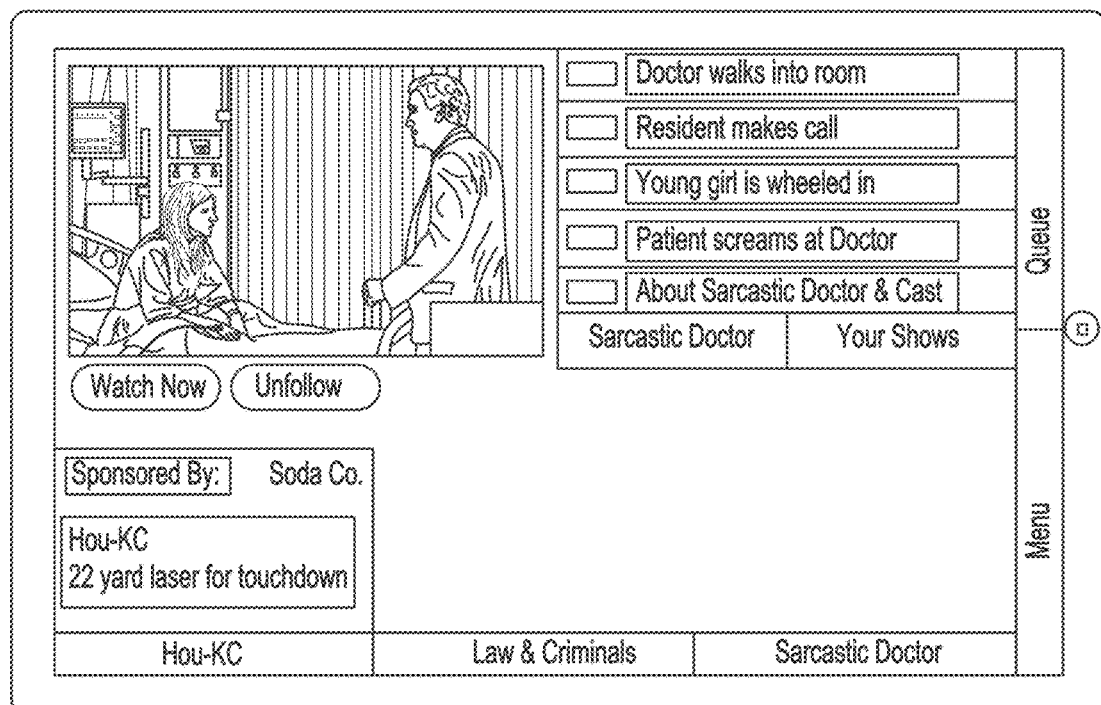

CONTENT EVENT MESSAGING

CROSS-REFERENCE TO RELATED APPLICATIONS

This application is a continuation of U.S. patent application Ser. No. 13/826,090, filed on Mar. 14, 2013, which is hereby incorporated by reference in its entirety.

BACKGROUND

Television viewers often browse different channels to monitor multiple programs or find a more interesting program to watch. A viewer may exhibit this behavior in various situations including checking a score in a sporting event, waiting for a particular program or segment to begin to air, or checking to see whether the program has resumed after a commercial break. Typically, viewers only view one or two channels on a television screen at a given moment and, therefore, they have limited awareness in the other channels not displayed on the television screen.

While a viewer may be able to watch one program and record a second program for later viewing, this approach is not perfect for keeping abreast of the two programs. The viewer may want to watch the programs live, or the programs may be enjoyed more if watched live. One example of a program that a viewer is more likely to desire to follow live is a sporting event and, often, many sporting events are being broadcast simultaneously. Thus, the viewer may be switching between the various sporting events in an attempt to keep up to date on the events' status, and the viewer may miss an opportunity to watch a sporting event, program, or other content that is more immediately of interest to them.

Thus, there remains an ever-present need to provide more useful tools to viewers so that they may be presented with information about content, such as a television program, that enables the viewers to learn of a development or event in the content or enables the viewers to switch to content that is more immediately of interest to them.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Some aspects of this disclosure relate to methods and systems for providing a user with data, e.g., in the form of messages, that include information describing events that occurred in content, such as a scene in a television program or movie, a development or play in a sporting event, or some other occurrence in another video program. Each event message may enable a user to view video (or other content) of the event once the user desires to view the event. Some of the methods and systems described herein provide for the presentation, e.g., display, of event messages to a user, the storage of the event messages so that the user may be able to browse through the stored event messages and decide when to view the video of the event, and the display of the video upon selection by a user.

In one or more embodiments, event messages may be transmitted to a user device. A computing device may register a device that is to receive event messages. The computing device may receive event message criteria, such as information identifying a user's request to be notified of the occurrence of a predetermined event in a transmitted content. At an appropriate time (e.g., during transmission of the content from a content provider, or in accordance with event message criteria), a computing device may determine that the predetermined event has occurred in the transmitted content. Responsive to determining that the event has occurred, the event message may be generated. The event message may alert the user of the occurrence of the predetermined event in the transmitted content. The event message may also include an option to initiate presentation of a portion of the content during which the predetermined event occurred, such as a stream of video. In some embodiments, the option may be a link to video of the predetermined event or data of the video, so that the user may view the video when they select the event message. Subsequently, the event message may be transmitted to one or multiple user devices. For example, the user device could be a device in communication with a television being viewed by the user and the user may also be using a second device, such as a tablet computing device, smartphone, or personal computer. In such arrangements, the event message could also be transmitted to the second device, for example, to display the event message on both the television (via the user device) and the second device.

Event messages may also include information describing multiple events and, thus, include a link or data, e.g., of a composite video, that is for the multiple events. For example, a user may be able to enter his or her starting lineup of a fantasy team as event message criteria. At a specified time (e.g., after the sporting events are complete or in accordance with user-defined criteria), an event message can be generated that includes the fantasy scoring plays for the user's fantasy team. In other words, the event message can be used to provide a video summary of the scoring plays that contributed to the score of the user's fantasy team.

The details of these and other embodiments of the present disclosure are set forth in the accompanying drawings and the description below. Other features and advantages will be apparent from the description and drawings, and from the claims.

BRIEF DESCRIPTION OF THE DRAWINGS

The present disclosure is illustrated by way of example and not limited in the accompanying figures in which like reference numerals indicate similar elements and in which:

FIG. 3 is a diagram showing an example system architecture on which various features described herein may be performed.

FIGS. 4A-4C illustrate different display arrangements in accordance with one or more aspects described herein.

FIG. 5A illustrates example displays in accordance with one or more aspects described herein.

FIG. 5B illustrates an example user experience in accordance with one or more aspects of the disclosure.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
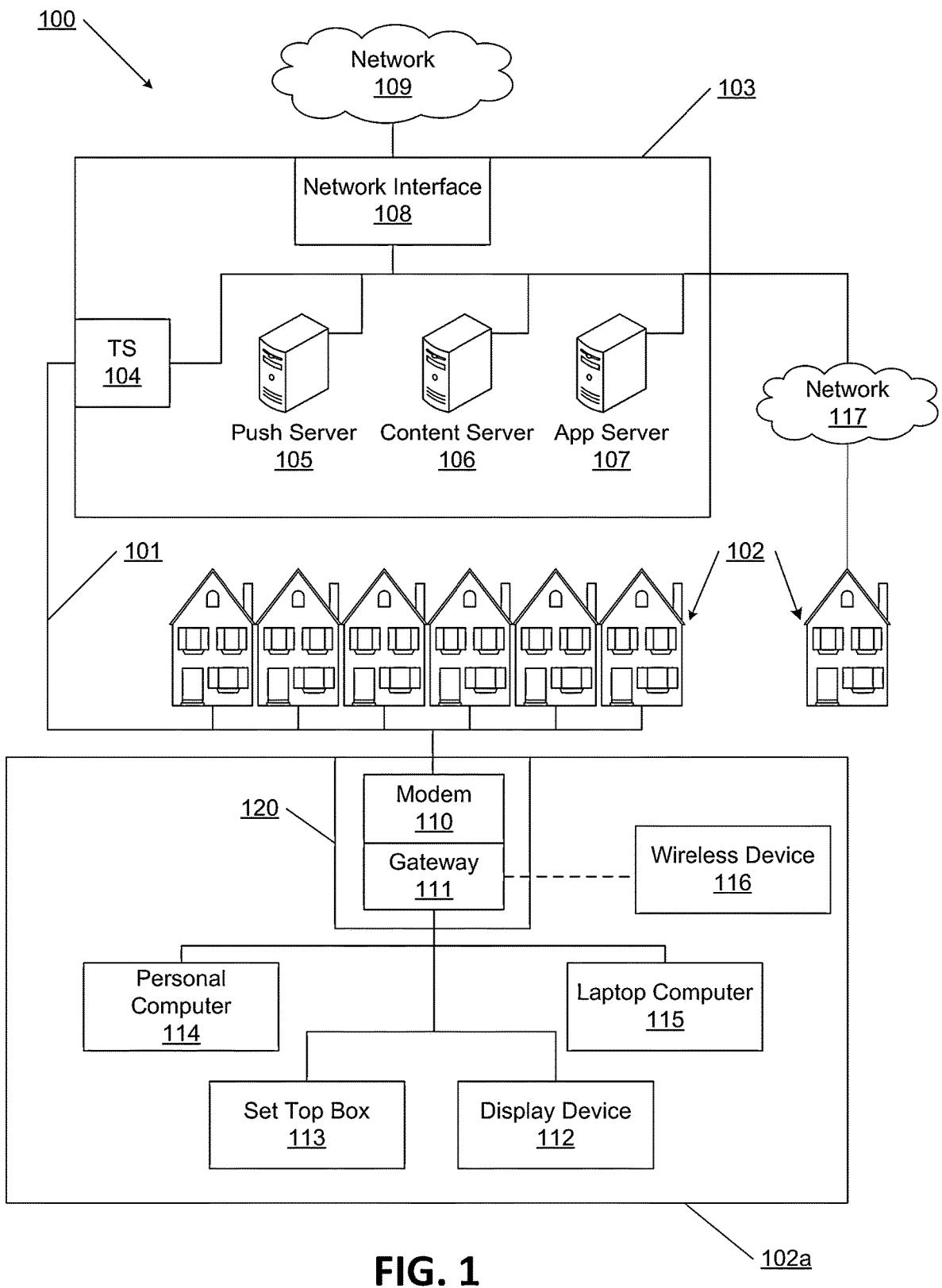
FIG. 1 illustrates an example network according to one or more aspects described herein.

FIG. 1 illustrates an example information distribution network 100 on which many of the various features described herein may be implemented. Network 100 may be any type of information distribution network, such as satellite, telephone, cellular, wireless, optical fiber network, coaxial cable network, and/or a hybrid fiber/coax (HFC) distribution network. Additionally, network 100 may be a combination of networks. Network 100 may use a series of interconnected communication links 101 (e.g., coaxial cables, optical fibers, wireless, etc.) and/or some other network 117 (e.g., the Internet) to connect an end-point to a local office or headend 103. Example end-points are illustrated in FIG. 1 as premises 102 (e.g., businesses, homes, consumer dwellings, etc.) The local office 103 may transmit information signals onto the links 101, and each premises 102 may have a receiver used to receive and process those signals.

There may be one link 101 originating from the local office 103, and it may be split a number of times to distribute the signal to various homes 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other links, or wireless communication paths.

The local office 103 may include a termination system (TS) 104, such as a cable modem termination system (CMTS) in a HFC network, which may be a computing device configured to manage communications between devices on the network of links 101 and backend devices such as servers 105-107 (to be discussed further below). The TS may be as specified in a standard, such as the Data Over Cable Service Interface Specification (DOCSIS) standard, published by Cable Television Laboratories, Inc. (a.k.a. CableLabs), or it may be a similar or modified device instead. The TS may be configured to place data on one or more downstream frequencies to be received by modems or other user devices at the various premises 102, and to receive upstream communications from those modems on one or more upstream frequencies. The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the local office 103 (e.g., a data processing and/or distribution facility) may include a variety of servers 105-107 that may be configured to perform various functions. For example, the local office 103 may include a push notification server 105. The push notification server 105 may generate push notifications to deliver data and/or commands to the various homes 102 in the network (or more specifically, to the devices in the homes 102 that are configured to detect such notifications). The local office 103 may also include a content server 106. The content server 106 may be one or more computing devices that are configured to provide content to users in the homes. This content may be, for example, video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the premises 102. Another application server may be responsible for formatting and providing data for an interactive service being transmitted to the premises 102 (e.g., chat messaging service, etc.).

An example premises 102a may include an interface 120. The interface 120 may comprise a modem 110, which may include transmitters and receivers used to communicate on the links 101 and with the local office 103. The modem 110 may be, for example, a coaxial cable modem (for coaxial cable links 101), a fiber interface node (for fiber optic links 101), or any other desired device offering similar functionality. The interface 120 may also comprise a gateway interface device 111 or gateway. The modem 110 may be connected to, or be a part of, the gateway interface device 111. The gateway interface device 111 may be a computing device that communicates with the modem 110 to allow one or more other devices in the premises to communicate with the local office 103 and other devices beyond the local office. The gateway 111 may comprise a set-top box (STB), digital video recorder (DVR), computer server, or any other desired computing device. The gateway 111 may also include (not shown) local network interfaces to provide communication signals to devices in the premises, such as display devices 112 (e.g., televisions), additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA)

interfaces, Ethernet interfaces, universal serial bus (USB) interfaces, wireless interfaces (e.g., IEEE 802.11), Bluetooth interfaces, and others.

Figure 2:
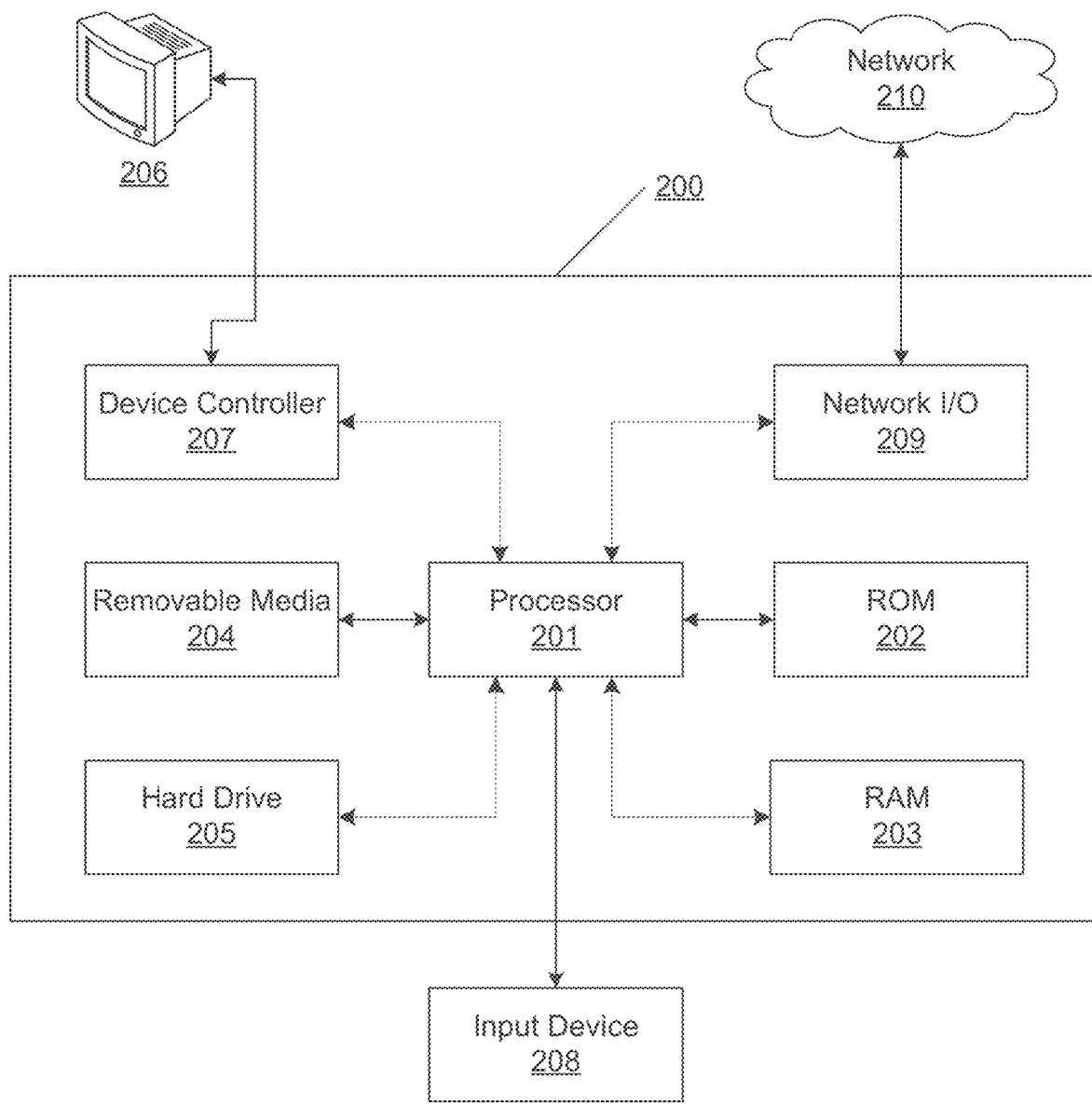
FIG. 2 illustrates an example computing device on which the various elements described herein may be implemented according to one or more aspects described herein.

FIG. 2 illustrates an example computing device on which various elements described herein can be implemented. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touchscreen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication links and/or networks illustrated in FIG. 1, or any other desired network.

The FIG. 2 example is an illustrative hardware configuration. Modifications may be made to add, remove, combine, divide, etc. components as desired. Additionally, the components illustrated may be implemented using basic computing devices and components, and the same components (e.g., processor 201, storage 202, user interface, etc.) may be used to implement any of the other computing devices and components described herein.

One or more aspects of the disclosure may be embodied in computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents such as integrated circuits, field programmable gate arrays (FPGA), application-specific integrated circuits (ASIC), and the like. Particular data structures may be used to more effectively implement one or more aspects of the invention, and such data structures are contemplated within the scope of computer executable instructions and computer-usable data described herein.

Various aspects of this disclosure relate to providing a viewer (also interchangeably referred herein as a user) with messages that include information describing events that have occurred in content. For examples, messages may be sent for scoring plays that occur during a sporting event or for scenes involving a particular actor or character in a television program. The content may include video data and/or audio data, such as a song or audio for corresponding video content. Further, while many of the examples described herein will be discussed in terms of video, the video can be accompanied by audio. Additionally, the concepts discussed herein may be similarly applied to an audio-only arrangement or other content arrangement, instead of a video or audio-video arrangement.

Each event message may inform a user of its occurrence, and may enable a user to view video of the event once the user desires to watch the event. The methods and systems described herein provide for the display of event messages to a user. In some arrangements, event messages may be generated/displayed as they occur in content. For example, when a player scores a touchdown during a football game, an event message may be generated at that time, or shortly thereafter, to inform users of this occurrence. The message may be of particular importance to fans of that player, or to fantasy football team owners who have that player on their starting roster. Alternatively, event messages may be generated at times independent of when the event occurred, such as when transmission of the content is complete or at times specified by a user or content provider. Additionally, the event messages may be stored so that a user may be able to browse through the stored event messages and decide when to view the video of the event. Upon a user selecting an event message, the video for the events may be transmitted to a device of the user so that the user may view the video.

The embodiments described herein include arrangements where event messages may be displayed on a single device (e.g., on a television via a gateway device or set top box) or on multiple devices (e.g., viewed on a television and another user device, such as a tablet, mobile device, or personal computer). FIG. 3 is a diagram showing an example system architecture 300 on which various features described herein may be performed, including those where event messages may be displayed on multiple devices. Various components of the example system architecture 300 may be performed using components similar to those discussed above in connection with FIG. 1. Further, FIG. 3 illustrates a scenario where one or more viewers consume content using two or more screen devices.

Content, such as video content, may be transmitted (e.g., streamed) from a local office 304 (e.g., a data processing and/or distribution facility) to the interfaces of various premises, such as premise 303 (see also local office 103, premises 102, and interface 120 of FIG. 1), and to first screen device 301. Thus, users A and B may consume content (e.g., view the content) at premise 30 using first screen device 301 (e.g., a television, display monitor, tablet computer, etc.). Notably, while consuming content, each user may operate a respective second screen device 302 to watch the content (e.g., by switching the viewing back and for the between the first screen device 301 and the second screen device 302) or to access other content (e.g., watch a different television program than being viewed on first screen device 301).

Although FIG. 3 shows some example second screen devices 302, many other devices may be used as second screen devices 302. Indeed, another television, similar in configuration to a first screen device 301, may be used as the second screen device 302.

Further, each of the second screen devices 302 may be configured to bi-directionally communicate via a wired and/or wireless connection with a second screen experience computing device 340 via the network 330. Specifically, the second screen devices 302 may be configured to access the network 330 (e.g., the Internet or any other local or wide area network, either public or private) to obtain data and to transmit/receive the data via the network 330 to/from the second screen experience computing device 340. For example, a second screen device 302 may transmit data through a wired connection, including the local office 304 which then routes the transmission to the network 330 so that it may eventually reach the second screen experience computing device 340. That is, the second screen device 302 may connect to the interface 309 and communicate with the second screen experience computing device 340 over-the-top of the links used to transmit the content from local office 304. Alternatively, the second screen devices 302 may connect directly to the network 330 to communicate with the second screen experience computing device 340. For example, a second screen device 302 may wirelessly communicate using, for example, a WiFi connection and/or cellular backhaul, to connect to the network 330 (e.g., the Internet) and ultimately to the second screen experience computing device 340. Accordingly, although not shown, the network 330 may include cell towers and/or wireless routers for communicating with the second screen devices 302.

Although FIG. 3 depicts the second screen experience computing device 340 as being separate from the local office 304, in some embodiments, the second screen experience computing device 340 may be located at the local office 304. In such embodiments, the second screen devices 302 may still access the second screen experience computing device 340 through the network 330. Further, even though the second screen experience computing device 340 is shown as a single element, in some embodiments, it may include a number of computing devices 200.

Still referring to FIG. 3, the local office 304 may include a router 305, a second screen experience management platform 306 for executing any of the steps described herein, and a database 307 for storing user information (e.g., user profiles), audio files, metadata, or the like. The router 305 of the local office 304 may forward requests for content from users and/or user devices (e.g., display device 112) to one or more CDNs 310 and 320 that may supply the requested content. Each of the CDNs 310 and 320 may include one or more routers 311 and 321, whose purpose is to receive requests from users (e.g., via their local offices) and route them to servers within its network that may store the requested content and be able to supply it in response to the request. A CDN 310 for a given piece of content might have a hierarchy of one primary source, and a plurality of lower-level servers that can store (e.g., cache) the content and respond to requests. The lower-level servers that ultimately service the request may be referred to as edge servers, such as one or more edge servers 312 and 322. The various servers may include one or more content databases 313 and 323, which store content that the respective CDN 310 and 320 manages. In some embodiments, the CDNs 310 and 320 may provide the same or similar content. In other embodiments, the content of the CDNs 310 and 320 may offer different content from one another. Also, the CDNs 310 and 320 may be maintained/operated by the same or different content providers. Although only two CDNs 310 and 320 are shown, many CDNs may be included in the system architecture 300 of FIG. 3.

Figure 4A:
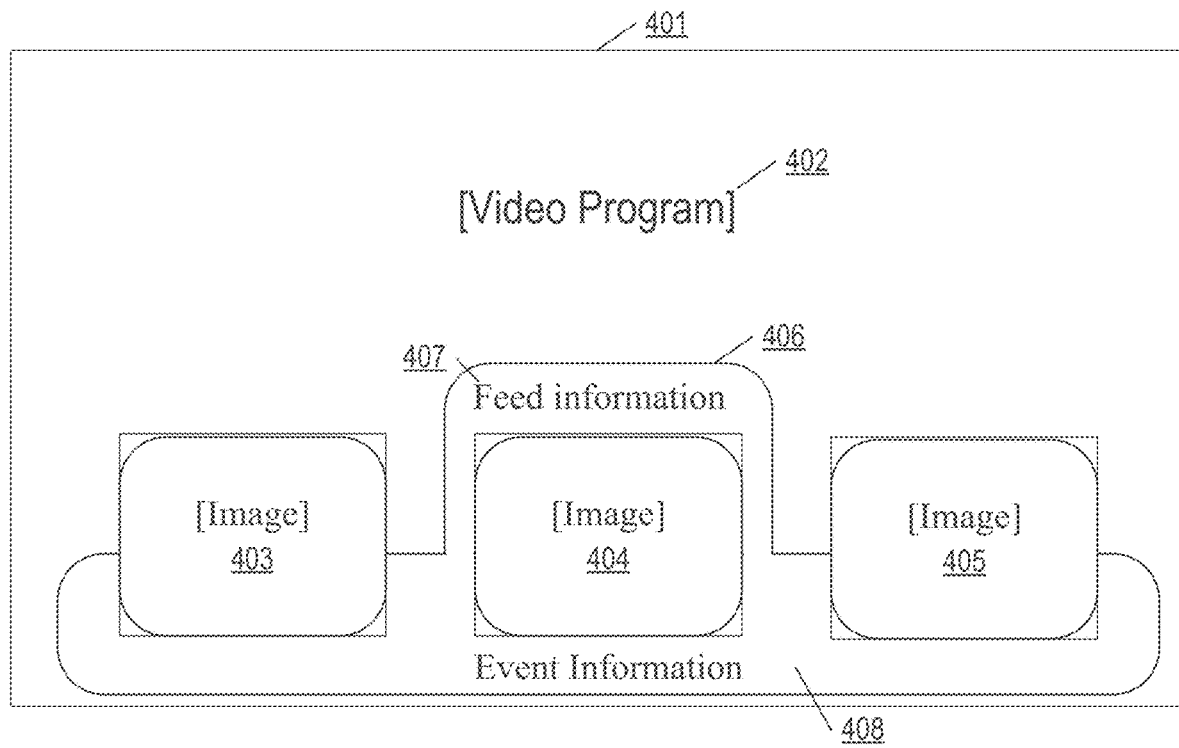
Figure 4B:
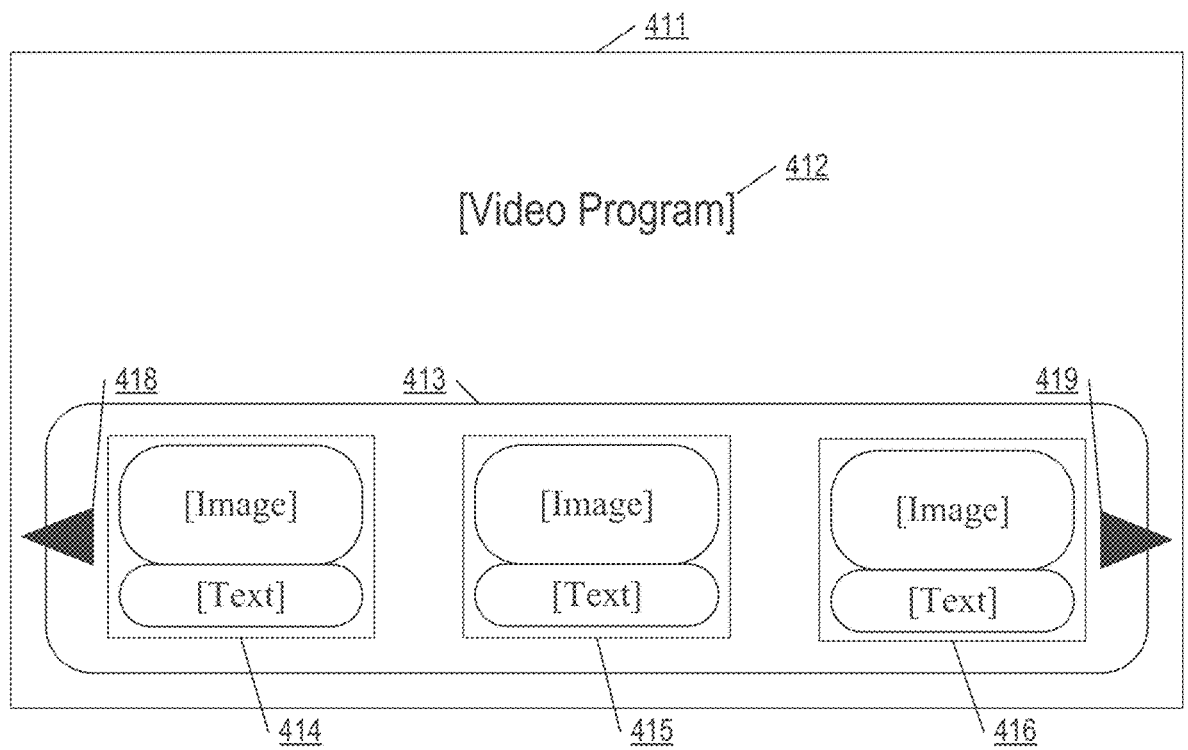

FIGS. 4A-4C illustrate different display arrangements that can be implemented using a single screen device on which a user may view or select event messages. Each of the displays depicted in FIG. 4A and FIG. 4B illustrates an embodiment where event messages are displayed on the screen as the event messages are received. However, each display displays the event messages and the information included in an event message in a different manner. Moreover, FIG. 4C illustrates an embodiment where event messages for a particular content are organized together and listed together when the identifier for that content is highlighted. The example event messages may inform the user of events occurring in other programs or other content. For example, the message may indicate that a particular quarterback has just thrown an interception in a football game, and may display a thumbnail image of the play (which may be animated with selected frames from the scoring play), and the user may select the message to quickly view the play and learn more about it. Additional details and examples of these event messages are provided further below.

The displays in FIGS. 4A-4C may be displayed on various screen devices (e.g., first screen device 301 and second screen device(s) 302) using, for example, an application executing on the screen device. In some arrangements, an application may be operating in the background on a device in the user's premises (e.g., a gateway device, interface device, or a set top box connected to first screen device 301) and the application may render the displays on the device during execution, such as when an instruction is sent from the local office to display an event message. Alternatively, the displays in FIGS. 4A-4C may be displayed on a second screen device (e.g.) such as, for example, where a user is viewing video on the second screen device. A user may operate his/her second screen device 302 to start an application, which may render one or more of the displays shown in FIGS. 4A-4C. In some cases, the user may be required to log-in before proceeding to use one or more of the features of the application. Logging-in may require entering a username and/or password. In this manner, the application may identify a user and provide functionality specific to that user. For example, the application may load a user profile that specifies the types of event messages the user wishes to see. Other actions, such as an action to modify the user's profile or to specify the types of event messages the user wishes to be displayed may be automatically associated with the user upon logging in.

Some characteristics may be common and uncommon between the different embodiments illustrated in FIGS. 4A-4C. For example, each event message (event messages 403, 404 and 405 of FIG. 4A; and event messages 414, 415 and 416 of FIG. 4B) may be identified to a user using an image. Additionally, a user may be able to select an event message such that the content corresponding to the event message is displayed. For example, with respect to FIG. 4A, event message 404 may be for a particular play of a football game and may be selected by a user to cause video of the particular play to be displayed as the video program 402.

FIG. 4A illustrates event messages 403, 404 and 405 as being organized in a linear fashion along the bottom of display 401 and overlaid upon video program 402, which the user may be viewing on the display device. Each event message may be displayed with an image or other identifier to allow a user to determine the content that the event message is alerting the user to. For example, if event message 403 is for a news program, a picture of the news anchor or channel logo may be displayed for event message 403. If event message 404 is for a sporting event, an image with one or more players of the teams involved in the sporting event could be displayed for event message 404. Alternatively, a logo of the league, the logo(s) of the teams involved in the sporting event, or a logo for the sporting event itself may be displayed as the image for event message 404. As another example, if event message 405 is for a television program, an image with one or more characters from the program, or a logo of the program may be used as the image for event message 405.

Information bar 406 may be configured to display the information included in an event message. Additionally, information bar 406 may be placed on the display 401 to identify which event message is currently highlighted by a user. As illustrated in FIG. 4A, event message 404 is currently highlighted and information bar 406 displays the information of event message 404 in two different portions: feed information 407 and event information 408. Feed information 407 may include such information as the service provider (e.g., NBC©); channel number or designation (e.g., 213, WABC); content title (e.g., Bears v. Packers; Wimbledon; Seinfeld season 2, episode 10); or other suitable information. Event information 408 may include a description of the event that occurred in the content. For example, if the event message is for a sporting event, the event message may include text describing a particular play the user may be interested in watching, such as a touchdown pass or homerun (e.g., "Manning passes 49 yards to Eric Decker for a touchdown" or "Albert Pujols hits his third home run of the night"). Accordingly, event information 408 may include descriptive text to allow the user to identify event message as being for video of the touchdown or homerun. As one other example, if the event message is for a television show or movie, event information 408 may include such varied descriptions as "Seinfeld has returned from commercial" or "Cuddy yells at House." What words are included in event information 408 is greatly dependent on the event message itself, the content for which the event message is being sent, and any information entered by a user to specify when to send event messages. Further details on the methods of determining or generating an event message are described below.

FIG. 4B illustrates display 411, which includes event messages 414, 415 and 416 that are organized as part of scrollable display bar 413 and overlaid upon video program 412, which the user may be viewing on the display device. As with the event messages of FIG. 4A, each event message of FIG. 4B may include an image to identify the content that the event message is meant to alert the user to. Further, each event message may include text describing the event that occurred in the content (e.g., include text similar to feed information 407 and/or event information 408 of FIG. 4A). In some instances, selecting an event message—such as by pressing an "OK" button on a remote, which causes the event message in the middle of scrollable display bar 413 to be selected—may cause video of the event being described by the event message to be displayed as video program 412. In others, however, the description of the event message may not fit into the text area of FIG. 4B and only a portion may be displayed when a user is able to scroll between the event messages of FIG. 4B. Thus, selecting the event message may expand the selected message (not shown) in order to display the entirety of the event message's description (e.g., expand to display only event message 415 as covering all of scrollable display bar 413). Upon display of the expanded event message, the user may be able to press another control that causes the video of the event being described by the event message to be displayed as video program 412.

To indicate the ability of a user to scroll between the various event messages, scrollable display bar 413 may include scroll controls 418 and 419. A user may be able to press the appropriate button (e.g., a scroll left button on a remote and a scroll right button on a remote) to change which events are displayed on the scrollable display bar 413. For example, as illustrated, event message 415 is displayed as being in the middle of the display bar 413. If a user was to scroll left once, event message 415 may move to the right and event message 414 may be displayed as being in the middle of the display bar 413. As a result of scrolling right, event message 416 may no longer be displayed and a different event message (e.g., a message received prior to event message 414) may be displayed on the left of event message 414. The event messages may also automatically scroll upon receipt of new event messages. For example, when a new event message is received, event messages 416 and 415 may move to the left. As a result of scrolling left, event message 414 may no longer be displayed and the new event message may be displayed to the right of event message 416.

In some embodiments, as new event messages are received, the new event message may be displayed in an order of receipt or based on some other message priority scheme. For example, event messages 414, 415 and 416 may be ordered in accordance to when they were received (e.g., message 414 was received prior to message 415, and message 415 was received prior to message 416). Alternatively, the messages could be arranged in a message priority queue, where messages with a higher priority are inserted at the front of the queue, while those with a lower priority are inserted towards the end of the queue. The user may be able to scroll through the queue of items, but display 411 may default to a view of the front of the queue or provide a view of the front of the queue every time a new event message is displayed. Additionally, as the user views or selects event messages in the queue, the viewed or selected event message may be removed from the queue and sent to a message archive that the user can view at a later time.

FIG. 4C illustrates display 421 that organizes messages according to source content. Each of the different source content may have its own identifier, and one or more of the identifiers may be displayed at a given time, such as identifiers 424, 425, 426 and 427. In other words, the embodiment of FIG. 4C differs from that displayed in FIGS. 4A and 4B in that event messages for a particular content (e.g., a particular football game, or particular television program) are organized together and listed together when the identifier for that program is highlighted. For example, identifier 424 may be for a television program, such as Seinfeld; identifier 425 may be for a football game, such as a Bears v. Packers game; identifier 426 may be for a movie being displayed on a premium channel such as HBO; and identifier 427 may be for a news program such as a local news broadcast of a channel local to the user. As each event message is received, the message may be associated with the appropriate identifier (e.g., event messages for the Bears v. Packers game are associated with identifier 425).

Event messages may also be received for content different from the four examples listed above. Such event messages would be organized under different identifiers (not shown) and a user may be able to scroll to them using the appropriate controls. The ability for a user to scroll left or right through the stored event messages (or the control a user must highlight to be able to scroll left or right) is depicted by scroll controls 428 and 429, respectively.

What content identifiers are shown on display 421 may depend on a content priority or other preference, such as a user preference or content provider preference. For example, the content identifiers with the most number of new or unviewed events may be displayed on display 421 (e.g., identifier 425 is shown on display 421 because it has the most number of unviewed event messages, while another identifier is not shown on display 421 because there are no unviewed event messages). As another example, the user or a content provider may be able to set certain content with a high priority so that when an event message is received for that content, the identifier will be shown on the display 421 (e.g., a user may set the Bears v. Packers game as high priority so that identifier 425 may always be displayed on display 421 when an event message is received and/or if there are unviewed messages for the Bears v. Packers game).

The content identifiers 424, 425, 426 and 427 may display various information. For example, an image, text or an animation of images may be displayed for each content identifier. In some arrangements, the image, text or animation of images may be taken from the most recent event message received for the content. For example, as depicted in FIG. 4C, identifier 424 may display an image from the most recent event message for Seinfeld; identifier 425 may display an image from the most recent event message for the Bears v. Packers game; etc. Alternatively, each identifier may display an image for the content that is not taken from an event message. For example, the user or content provider may be able to select what is displayed when identifier 425 is displayed (e.g., the user may select a picture of their favorite player for display, or a content provider may be able to select an advertisement or sponsored image for display).

When a user highlights a particular identifier, information pane 423 displays information related to one or more of the event messages associated with the identifier. For example, when a user scrolls such that identifier 425 is overlaid on information pane 423, a listing of the event messages associated with identifier 425 may be displayed in history panel 430. A short description may be included in the listing for each event message, such as a date or time the event occurred and/or a brief text string describing the event (e.g., "Johnson goes over 200 yards receiving").

The user may be able to scroll up and down through the listing displayed on history panel 430 to highlight a particular event message. When the user highlights a particular event message in the listing, the user may select it to view additional information about the message (e.g., description panel 440 may include the entire description of the event message and any feed information included in the event message). Further, after selecting a particular event message, the user may select any of the options within options panel 435. Options panel 435 may include various selectable options, such as, for example, a "play now" option (shown) that causes video of the event to be displayed as video program 422 upon selection by a user. Options panel 435 may include a "bookmark" option (shown) that causes the event message to be added to a favorite list of the user so the user can find the event message on a favorite list when desired (in embodiments with a favorite list, the favorite list may be viewed in various ways, such as its own identifier that a user can scroll to while scrolling through identifiers 424, 425, 426 and 427, or the user may view the favorite list by pressing an appropriate control). Options panel 435 may include a "send to a friend" option (shown) that allows a user to e-mail, short message service (SMS) or otherwise transmit the event message, a link to the video of the event, or the video itself, to one or more other users. In some arrangements, options panel 435 may include an "other options" option that activates a display listing all other options to the user, such as a display that would allow the user to set up a digital video recording of the program corresponding to the event message (e.g., set up a series recording for Seinfeld if the event message is of a scene of a Seinfeld episode) or share the event message or link to the event message's video using social media (e.g., share via Facebook or Twitter). In some embodiments, a user may also be able to delete a received event message or otherwise remove an event message being listed in history panel 430.

In some instances, description panel 440 may include other information than the description of a particular event message. For example, text panel 440 may include a description of the content associated with the highlighted identifier. As one particular example, if content identifier 425 is for a Bears v. Packers game, text panel 440 may include a description of the game, including the channel the game is being broadcast on, the time the game is played, the current score of the game, and a brief textual description of the game (e.g., "the 6-4 Bears play the 6-4 Packers in this important division game that could determine which team wins the division.").

Figure 4D:
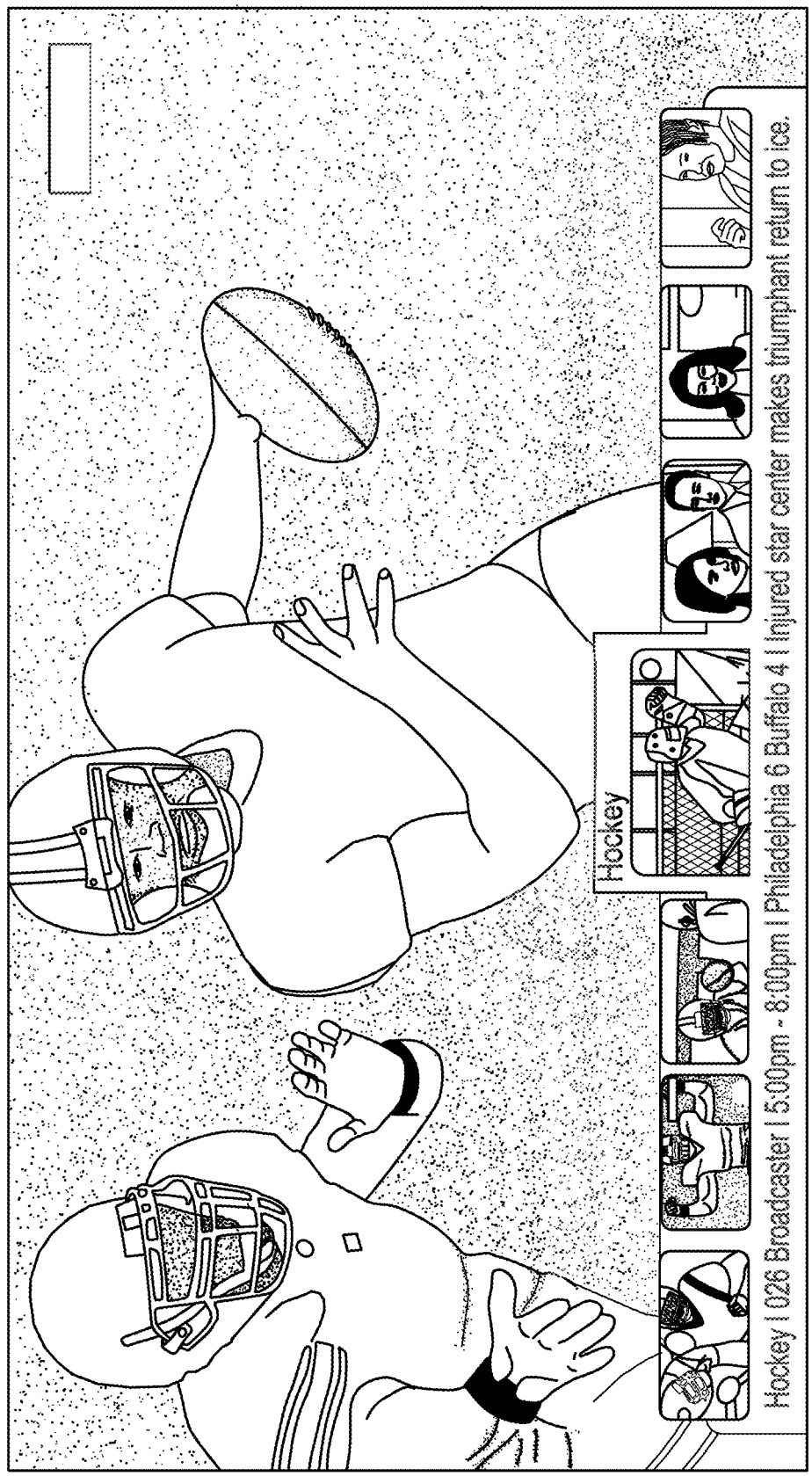
FIGS. 4D-4F illustrate example user experiences involving event messages in accordance one or more aspects of the disclosure.
Figure 4E:
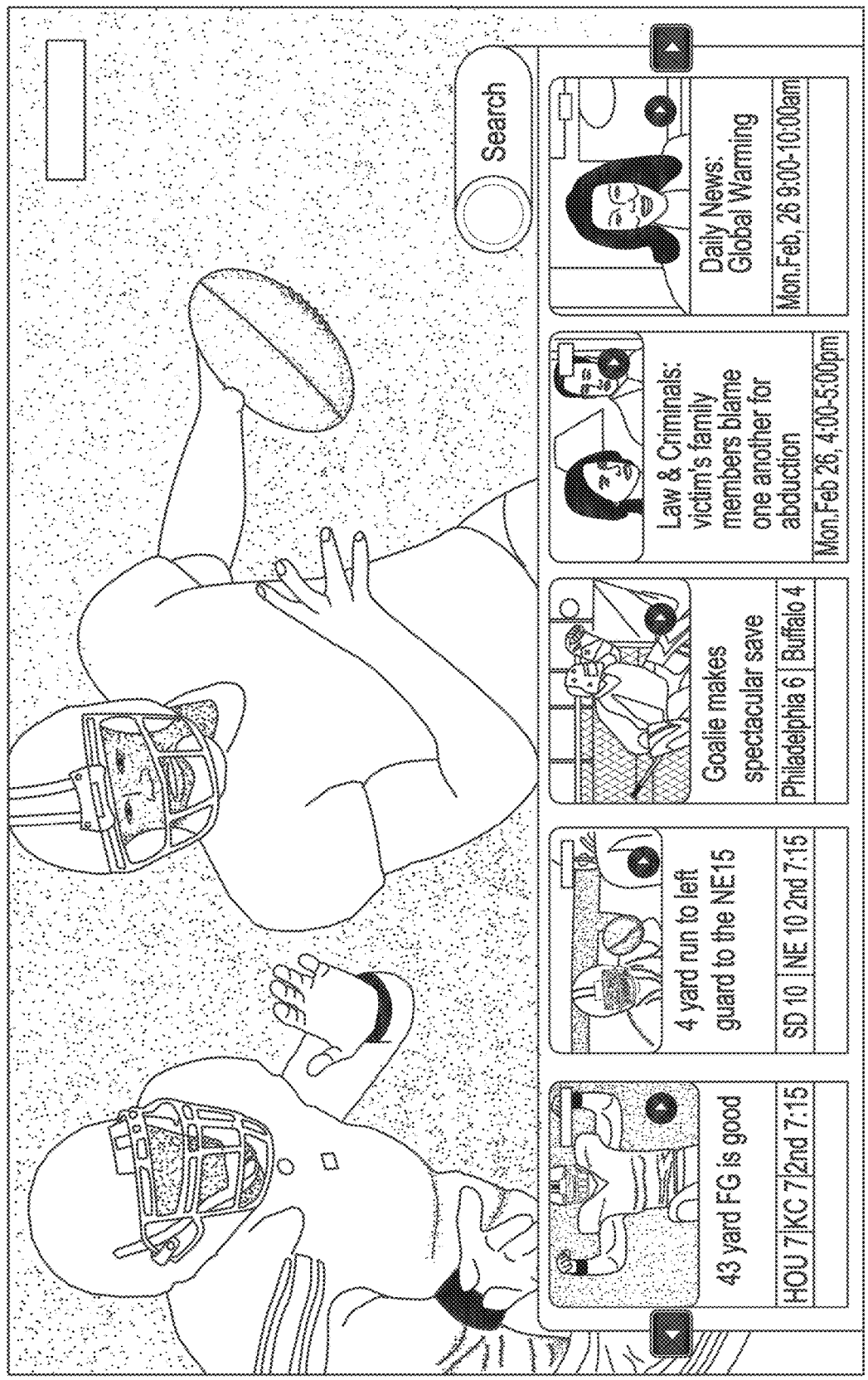
Figure 4F:

FIGS. 4D-4F illustrate example user experiences for viewing or selecting event messages of display arrangements that may be implemented on a single screen device. Various aspects described in connection with FIGS. 4A-4C can be found on the example user experiences of FIGS. 4D-4F. In particular, FIG. 4D illustrates user experience 450, which shows various alert messages on a display similar to that discussed above in connection with FIG. 4A and illustrates an event message for a hockey game being highlighted. FIG. 4E illustrates user experience 460, which shows various alert messages on a display similar to that discussed above in connection with FIG. 4B, and illustrates event messages for two different football games, an event message for a hockey game, an event message for a show titled "Law & Criminals" and an event message for a Daily News program. FIG. 4F illustrates user experience 470, which shows various alert messages on a display similar to that discussed above in connection with FIG. 4C, and illustrates a football game being highlighted and a history of event messages for the highlighted football game.

FIG. 5A illustrates an example display for an arrangement that uses two screen devices, namely a first screen device (e.g., a television) and a second screen device (e.g., a tablet computer, smart phone, or personal computer). As illustrated in FIG. 5, the first screen device may have display 501 and a user may be viewing video program 502. The user may also be viewing content on a second screen device, which has display 511. In some arrangements, the content of the second screen device may be synchronized with the content of the first screen device. For example, content supplemental to video program 502 may be displayed as video program 512 (e.g., if a movie is being displayed as video program 502, interactive video content, or an Internet page, related to the movie may be displayed as video program 512). In others, the user may be separately controlling what video is displayed as video program 502 and video program 512 (e.g., the user chooses a television program for display as video program 502 and a sporting event for display as video program 512).

The user may have previously set up criteria defining which content that he or she wishes to be notified of when certain events occur in the content. As illustrated in FIG. 5, the user has specified event message criteria for at least three different contents: first content, second content, and third content. Each of the three contents is represented on display 511 with an identifier: identifier 513 for the first content; identifier 514 for the second content; and identifier 515 for the third content. Each identifier may include images, such as logos; text, such as the content title; or other data to identify the content to a user. For example, throughout the description of FIG. 5, an example will be described where the first content is a football game between the Bears and the Packers. Accordingly, identifier 513 may include an image of a player from the Bears or Packers, a logo of the National Football League, or a logo of the channel broadcasting the game. Further, identifier 513 may include text identifying the game (e.g., "Bears-Packers").

In one example, first content may be a sporting event (e.g., Bears v. Packers), second content 514 may be a movie (e.g., The Natural), and third content 515 may be a different sporting event (e.g., Minnesota v. Detroit). Each content may be currently being transmitted (e.g., streamed or broadcast) from a content provider. As the events occur for the two sporting events and the movie, each event message may be displayed on the first screen device and the second screen device. For example, in one or more embodiments, the first screen device may display the event message 503 as a pop-up display. The pop-up display may include various portions of images and text that are included in the event message in order to identify the event and/or content to the user. The event message may also be displayed on the second screen device as it occurs.

Continuing the example where the first content is a football game between the Bears and Packers, event message 503 may be for a passing touchdown. When the event occurs, the user may be viewing a television program of a different channel as video program 502 of the first display device (e.g., an episode of Seinfeld may be playing as video program 502). When the touchdown pass occurs, event message 503 may be displayed as a pop-up display on the first screen device (as shown in display 501). The pop-up display of the first screen device may include various images or textual data to identify event message 503 as being for video of the touchdown pass. For example, the pop-up display of the first screen device may include an image of one or more players from the Bears or Packers, or a representative frame taken from a video segment of the event (e.g., an image of the quarterback throwing the ball during the touchdown pass play, or an image of the receiver catching the ball during the touchdown pass play). A short text string may also be included on the pop-up display of the first screen device that describes the event (e.g., "Bears score six with long TD pass"). Other information may also be included on the pop-up display of the first screen device, including a logo or other image related to the content or the event.

The event message 503 for the touchdown pass may also be displayed on the second screen device using a similar pop-up display. However, the pop-up display for event message 503 of the second display device may include different information and may be placed differently on display 511 than it was placed on display 501 of the first screen device. For example, the pop-up display of the second screen device may include an advertisement, such as a sponsor for the sporting event or the event message functionality (e.g., "sponsored by Comcast"). Additionally, the pop-up display of the second screen device, instead of being overlaid on a video program (see display 501), may be placed adjacent to an identifier for the event's content. As depicted in FIG. 5, the pop-up display of the second screen device is placed next to the identifier 513 for the first content, which in this example is the identifier for the Bears v. Packers game.

When the pop-up display for the event message 503 is being displayed on either or both of the screen devices, a user may select the event message (e.g., a user may touch, via a touchscreen, the pop-up display of event message 503 on the second screen device) to cause display 511 to display information related to the event message 503. For example, video display panel 512 may display the video for the event of event message 503 as the video program (e.g., display the video of the touchdown pass).

Message panel 520 may include a listing of event messages for the content that were previously received for the content corresponding to the currently selected event message (or selected identifier 513, 514, 515). Additionally, in some arrangements, message panel 520 may include an entry in the listing to view the live video of the content. Each entry included in message panel 520 may be selectable by a user so the video corresponding to the selected entry is displayed on video panel 512. For example, message panel 520 for a football game may include entries for viewing the live football game, and entries for each event message received for that football game such as entries for the touchdown pass (an entry for event message 503) and, for example, an entry for a kickoff touchdown, an entry of a fumble at the goal line and an entry for a 40-yard run.

Display 511 may also display a "watch now" button 517 and an "unfollow" button 518. If a user selects the "watch now" button 517, the video currently being viewed in video panel 512 may be also displayed as the video program 502 of the first screen device. Upon selection of the "watch now" button, a command may be transmitted from the user's premises to a local office of a content provider. The command may be processed so that the same video is also transmitted to the first screen device (e.g., displayed in both video panel 512 and displayed as video program 502 of display 501). For example, after the user selects the pop-up display for event message 503 on the second screen device, video panel 512 may display the video for the touchdown pass. If the user selects the "watch now" button 517, the video for the touchdown pass may also be displayed as video program 502 on the first screen device. In some instances, this may cause a time-shift to occur in video program 502, such as when the video program goes from live video back to a past time to view the touchdown pass.

If a user selects the "unfollow" button 518, the content corresponding to the video currently being viewed in video panel 512 may be removed from those the user is currently receiving events messages. For example, after the user selects the pop-up display for event message 503 on the second screen device, video panel 512 may display the video for the touchdown pass. If the user selects the "unfollow" button 518, the football game (e.g., first content) may be removed from the content that the user wishes to receive event messages. Accordingly, identifier 513 may be removed from display 511 and the system will no longer display event messages for the football game on the first screen device or the second screen device.

Display 511 may include various other user selectable items. For example, each of the identifiers for the content (e.g., identifier 513, 514 and 515) may be selectable by the user to view video of the content in the video panel 512. In some instances, the live video of the content may be displayed upon the user selecting a particular identifier from identifiers 513, 514 and 515 (e.g., display the live football game upon the user selecting identifier 513). The user may also be able to create a queue of events to view (e.g., add an event message to a queue by performing a long-press via a touchscreen or a right click of a mouse when the pointer is over the event message), and display 511 may include a button for viewing the queue or a button to begin viewing video of the events in the queue (not shown) on video panel 512. Display 511 may also include a menu button or other suitable control to allow a user to adjust the settings of the application controlling display 511, or another button to adjust the content for which the user wishes to receive event messages. For example, the user may want to begin receiving event messages for another sporting event and may be able to enter criteria on a data entry display defining what event messages should be displayed (e.g., a user may enter the specific sporting event they want to follow and user-defined criteria that would cause event messages to be displayed upon, for example, scoring plays, or plays involving particular players).

FIG. 5B illustrates an example user experience for viewing or selecting event messages of an arrangement that uses two screen devices. Various aspects described in connection with FIG. 5A can be found on the example user experience of FIG. 5B. In particular, FIG. 5B illustrates user experience 520, which shows an alert message (e.g., an event message for a football game between Houston and Kansas City) and a video program being viewed on a display similar to a first screen device's display 501 of FIG. 5A (e.g., video for a program titled "Sarcastic Doctor"). FIG. 5B also illustrates user experience 530, which shows various alert messages on a display similar to that discussed above in connection with display 511 of a second screen device (e.g., a video panel for a video program, currently displaying video for "Sarcastic Doctor"; a history of event messages for "Sarcastic Doctor"; and three programs being monitored for event messages, the football game between Houston and Kansas City with the recently received event message, a program titled "Law & Criminals" and the program "Sarcastic Doctor").

Although the above description explains that the displays in FIGS. 4A-4C and FIG. 5A specific to a single screen device arrangement or a two screen device arrangement, it should be understood that the components of each display could be used under either arrangement or other display arrangement variations. Further, while the above displays could be implemented as part of one or more applications, the displays could be implemented using other types of software, such as a web page. For example, in some embodiments, a user may navigate to a designated website, define even message criteria, receive event messages and view video through the web site.

Figure 6A:
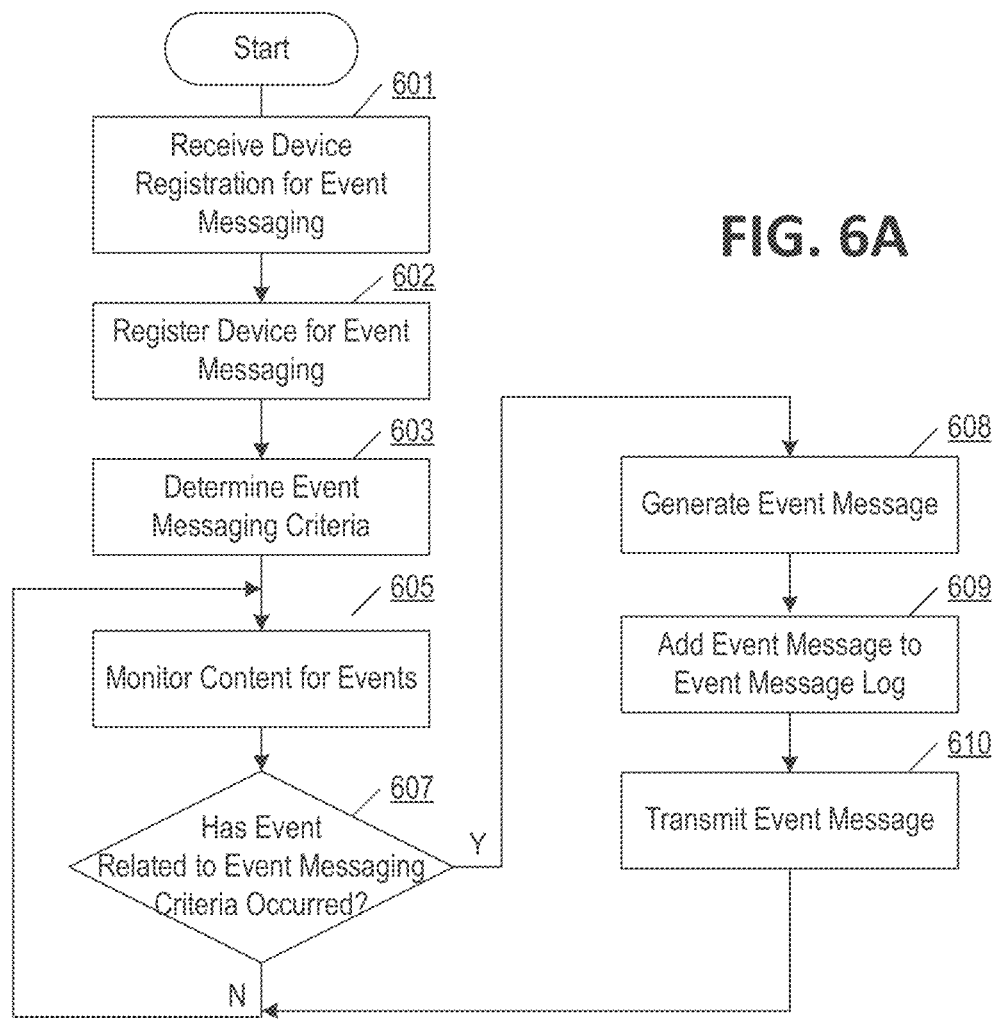
FIGS. 6A and 6B are flow diagrams illustrating example methods in accordance with one or more aspects of this disclosure.
Figure 6B:
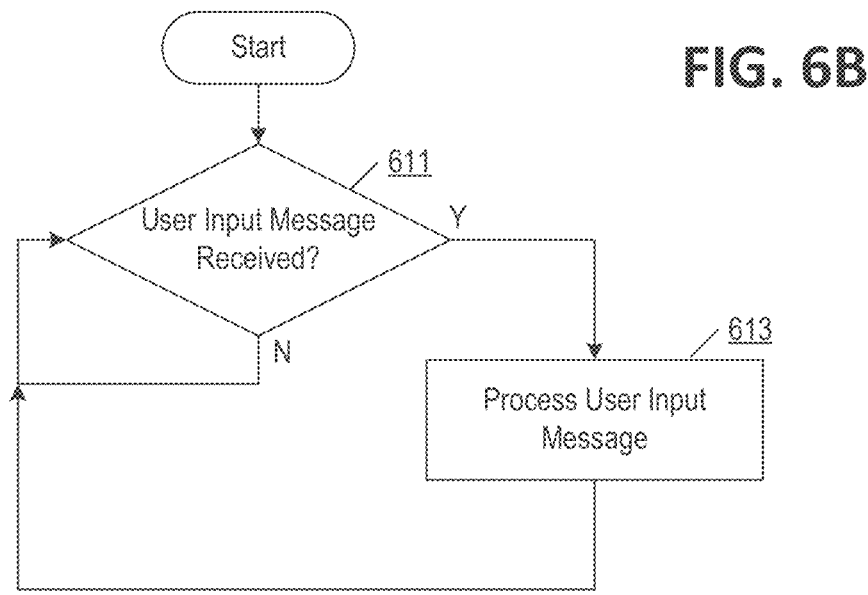

FIGS. 6A and 6B are flow diagram illustrating example methods in which one or more computing devices may generate and transmit event messages to another device for display to a user. In particular, FIG. 6A illustrates an example method in which event messages are generated and transmitted. FIG. 6B illustrates an example method in which the system can process user input to, for example, change event message criteria or change the video being transmitted to the user's premises. While the example methods of FIGS. 6A and 6B can be performed by one or more servers of a content provider (e.g., a server at a content provider's local office, such as one or more servers depicted in FIG. 1 or FIG. 3), portions of the methods may be performed at other computer devices, such as a device at the user premises including an interface device, gateway device, set top box, or other computing device.

Referring now to FIG. 6A, at step 601, a computing device may receive device registration data for event messaging. The device registration data may include identifiers for one or more devices associated with a user, such as media access control (MAC) addresses or IP addresses of a device that is to receive event messages. The device registration data may also be accompanied by a user's log in information, such as user name and password. A user profile may also accompany the device registration data.

At step 602, a computing device may register the one or more devices from the device registration data for event messaging. In some instances, registering a device may include placing the device identifier on a listing of devices that are to receive event messages, or registering the device identifier with a computing device that executes an event messaging service. The user's log-in information may also be verified at this time. If correct, the user may be allowed to proceed with receiving event messages. However, if the information is incorrect, the user may have to reattempt the log-in.

Additionally, the computing device may determine whether the device has previously registered for event messages. If the device has already pre-registered, the computing device may activate event messages for that device, such as by activating a device status to "on" so that event messaging will resume for that device. In some arrangements, the device status may stay "on" so long as the device stays connected to the network, or until a message is received at the computing device to disable the event messaging service (such as by a user request to disable event messages from being transmitted to the device).

When registering a device, the computing device may also determine whether a user profile exists for the user. If one is found it may be retrieved or sent to the computing device that executes the event messaging service. In some arrangements, if the user profile has not been established, the user may be prompted to enter information to create the profile. In some arrangements, the user profile may be stored at the device being registered or in a database of a content provider (e.g., a database at a local office). Further, device registration may include receiving the user profile from the device being registered and storing the user profile in a location accessible to the computing device.

Additionally, the computing device may also transmit a listing of registered devices and their addresses to the device being registered, so that the device being registered can store the listing and addresses. Such addresses may be used in some embodiments to indicate that the content corresponding to an event message should be transmitted to a different device (e.g., an event message is selected by a user on a second screen device but the content of the selected event message is to be viewed on a first screen device). If changes to the registered devices occur (e.g., a device is unregistered, or a device's address changes), the computing device may update each registered device with an updated listing and updated addresses.

At step 603, a computing device may determine event messaging criteria. The computing device may determine event messaging criteria in various ways. For example, the computing device may receive information identifying a user's request to be notified of the occurrence of a predetermined event in a transmitted content. For example, a user may input information—via a user device, such as a tablet computer or other computing device at a user's premises—that defines event messaging criteria that is desired by the user. By inputting the event messaging criteria, a user may specify the event messages that he/she will receive. For example, if a user desires only to view event messages for a football game currently being broadcast, the user may specify the football game as part of the event messaging criteria. The user may further desire to only view particular events that occur during the football game. Accordingly, the user may specify additional criteria, such as criteria specifying that he/she wants to receive only scoring play events, events for plays involving particular players and the like. In some embodiments, a user may be allowed to specify any desired criteria (e.g., allow the user to input text that will be matched to an event). In other embodiments, the user may be limited to various criteria choices that the content provider makes available to a user (e.g., the user is limited to 10 different types of event messages for a football game, a different set of 10 types of event messages for a television program, etc.). Event message criteria may also be retrieved or determined from the user profile. Further, event message criteria may be included in the content by a content provider or content creator (e.g., "suggested event message criteria," which may be based on a user's prior use of content or the provider's own suggestions). Such suggested event message criteria may be retrieved or determined from the content.

The limited criteria choices may be based on the types of information gathered through a content recognition process. Content recognition processes, such as video and audio analysis processes, may be used as part of a content segmenting process that generates content segments. In some embodiments, the content segments may be used when determining whether to generate an event message based on the event message criteria. The content recognition processes may result in data such as text or metadata that describes the content segments. For example, text or metadata may include a short descriptive title for the content segment and text describing one or more entities present in the segment (e.g., the name of a player that appeared on a display during a football play, or the name of an actor that appeared in or spoke during the content segment); a description of the music sound tracks playing during the content; a description of the geographic location where the content depicts/takes place (e.g., in a European city or in a sports stadium); a description of any landmark presented in the content (e.g., the Eiffel Tower); a description of any product or brand within the content or associated with the content (e.g., criteria defining a brand of beer); a type of scene within the content (e.g., car chase, gunfight, love scene); a type of program (e.g., news program, sports program); or the like. Further, the text or metadata may include an indication of the type of play (e.g., rushing play, passing play), whether a penalty was called/flagged during the play, whether a score occurred during the play. Segments may also be described with other information that is specific to the type of video being processed. For example, with respect to football content, a segment may be described with such information as yards to go for a first down, the down number, and the like. The choices available for selection may include any of the information in the text/metadata (e.g., a user could set the criteria as $3^{rd}$ downs with 5 yards or less to go).

The types of information that can be generated by a content recognition process is not limited to only the above-mentioned types. Additionally, descriptive data or "tags" that results from a content recognition process and any data available about the segment can be used to infer additional descriptive data. Continuing the football example above, down number, yards to go, and that the content is a football game may be some of the data available about a segment. A $3^{rd}$ down and short event can be inferred from that data. The criteria for event messages can be quite extensive and include many events built from knowledge about the type of content.

Additionally, the event messaging criteria may include criteria defining when an event message should be generated/sent or defining how many events should be included in an event message. For example, the user may define criteria so that an event message is generated every time an event occurs. Criteria may also specify the time when the system should generate an event message (e.g., a time of day, or only when the content has finished being transmitted). Moreover, many of the above described examples were with respect to an event message for a single event occurrence (e.g., an event message for a single play of a football game). However, an event message could be generated that includes more than one event (herein referred to as a "composite event message") and the user could specify the criteria for generating such a composite event message. The user may define criteria so that the composite event message includes any event that occurred over a user-specified time period or for the duration of the content's transmission. Continuing the football example, users watching a football game may also be interested in one of his or her fantasy football teams. The user may be able to enter criteria defining the players on his/her team so that an event message showing all fantasy scoring plays can be generated at a specified time (e.g., touchdowns, runs, receptions, turnovers, and the like involving his/her fantasy player).

Event criteria may further include criteria defining what the user does not want to see. For example, a user may never want to view an event that includes a particular person, character, type of scene, music, etc. Such criteria could be combined with other criteria to define both characteristics that should never appear in an event and those that should occur (e.g., identifying a particular singer and additional criteria identifying that an event should never include music, so that events such as interviews about the singer would be presented to the user).

Event messaging criteria may include criteria defining additional recipients of the event message. For example, an event message could be generated for a fantasy football game (e.g., a listing of all players on each fantasy team) and criteria identifying another user that should receive the event message (e.g., another user of the content provider's network, or an e-mail address that could include a link to the video of the events for the fantasy football game). In some instances, the user may be able to specify criteria that can be used when ordering the events of a composite event message.

In addition to user-defined event messaging criteria, event messaging criteria may be determined based on data collected by the content provider. For example, viewing habit data of the user or another user may be used to define criteria for one or more event messages that will be generated and transmitted to the user. As one particular example, a user may commonly watch a television program that is of a similar genre as another television program. The event messaging criteria may include criteria so that event messages related to one or both of the television programs are generated. As another example, the content provider may define event message criteria so that whenever a particular commercial or advertisement occurs, an event message will be generated and transmitted.

At step 605, a computing device may monitor content for events. In general, the computing device may monitor the content by searching a video segment database. For example, a content segmentation process may be executing at the content provider's local office to segment content as the content is broadcast or being otherwise transmitted and generate data that describes each segment (e.g., a short descriptive title for the content segment and one or more entities present in the segment). The content segmentation process may use any number of suitable video and/or audio analysis processes and may result in data entries describing the various segments that were found in the content. In some arrangements, content is stored in a content repository and segment descriptions are stored in a segment database. The segment descriptions may include content identifiers or content link; time links or time-codes, and additional data that describe the segment and enable the content corresponding to the segment to be retrieved from the repository (e.g., the video corresponding to a segment is retrieved according to the content identifier and the beginning and ending time-codes of the segment). When monitoring for events, the computing device may be able to search the segment descriptions, or search the data for a new segment when the new segment is determined by the content segmentation process.

At step 607, a computing device may determine an event of the event messaging criteria has occurred. In general, the computing device may determine whether an event has occurred if criteria of the event messaging criteria matches data describing one or more segments (e.g., the segments produced by a segmentation process running in parallel to the event messaging process). For example, if the event messaging criteria includes criteria to generate event messages whenever a touchdown is scored during a football game, segments determined by the content segmentation process may be monitored for a segment that is a play that is from the football game and where a touchdown was scored (e.g., search for the word "touchdown" or other word used by the content segmentation process to describe a touchdown play). If the event has occurred, the method may proceed to step 608. Otherwise, the method may continue to wait for an event to occur by proceeding back to step 605 to repeat steps of monitoring the content and determining whether an event has occurred.

At step 608, a computing device may generate the event message to, for example, alert the user that the event has occurred in the content. The event message may include an image and/or text that describes the event and, in some arrangements, may include multiple sets of image/text descriptors which are specific to a number of factors, such as display device, application, user rights, etc. The image/text descriptors may also include audio, descriptive icons, links to extended or external information (webpages, text, images, video, stats), and other types of content. In some arrangements, the data included in an event may be retrieved from the searchable database with the content segments. For example, each entry may include an identifier for a keyframe from the segment and a short textual description of the segment. The keyframe may be used as the image for the event message and the short textual description may be included in the event message. Other data may also be included in the event message, including feed information such as channel identifiers and the like. In general, an event message may include any of the information that was described in connection with FIGS. 4A-4C and FIG. 5 when displaying an event message to a user. Additionally, the event message may include an option to initiate a portion of the content during which the predetermined event occurred. For example, an event message may include the content data, a link to the content, content identifiers, beginning or ending time-codes for the content corresponding to a segment of content, or some other mechanism to initiate consumption of the content. In some instances, the content data, link to the content, content identifiers, time-codes, etc., may be retrieved from the content repository and segment database. Alternatively, in some arrangements, a user's digital video recorder (either a network DVR or a local DVR) may be used to store the content and the event message may include a link to the storage location of the content, a time code at which the video for the event begins and a time code at which the video for the event ends.

In instances where the event message includes one or more events, the computing device may create a composite video that includes the video of each event in the event message. Additionally, the video for the events may be ordered according to various criteria. For example, the video could be ordered based on time (e.g., events that occurred first come sooner in the composite video); according to user-defined criteria, such as by a user-defined priority for the events (e.g., touchdowns come first, followed by long runs, etc.); or ordered by some other criteria that is dependent on the type of event or event message (e.g., the criteria for ordering a composite video for an event message with events from a movie would be different than the criteria for ordering a composite video for a fantasy football game with events from various football games). The content provider may also define various criteria that can be used when ordering the composite video. For example, the content provider may define ordering rules, such as rules that are meant to increase the dramatic effect of the composite video. Continuing the above example of an event message for a fantasy football game, the content provider may mix or alternate fantasy scoring plays of each team to simulate lead changes. Additionally, the content provider may order the video based on the magnitude of the fantasy scoring involved in the play. For example, short runs or receptions may come earlier in the composite video, while touchdowns come later in the composite video. Further, the content provider could include one or more failure plays in the composite video. For example, the system, when building the composite video, may search the segment database for play that failed to result in fantasy points (e.g., a pass that missed a wide-open receiver) to give the impression that points are about to be scored and maybe the impression that a team is about to increase a lead or start catching up to the opponent's score. Inclusion of plays that fail to result in fantasy points may allow for the creation of a composite video for a fantasy game that more accurately matches the randomness of a real football game.

Further, the computing device may insert various other data into the video or the event message. For example, an advertisement may be inserted at one or more places in the video, or a banner advertisement may be included in the event message so that whenever the event message is displayed, a banner advertisement is also displayed on the display. The computing device may also insert images or text to the event message, such as images and text of a sponsor that pays for the event message or the event message service. Interactive content (or a link to the interactive content) may also be included in an event message, such as content that allows a user to purchase access to the content prior to consumption or purchase access to the event message service. For example, upon a user selecting an event message, the user may be directed to a page or application that facilitates the user's purchase. After validating the purchase, the user may be directly presented with the content of the event message. As another example, when a user receives his or her first event message (or first message according to a periodic schedule, such as monthly), upon the user selecting the event message, the user may be required to purchase access to the event message services before viewing any content provided by the event message. After validating the purchase, the user may be directly presented with the content of the event message.

At optional step 609, the computing device may add the event message to an event message log that includes a history of the event messages generated for a user. In some instances, a user may be able to search or view the log in order to select a previously-generated event message at a later time.

At step 610, a computing device may transmit the event message. The computing device may transmit the event message in many different ways. For example, the computing device may transmit the event message to one or more user devices, such as any of the devices described in connection with FIG. 1, FIG. 3, FIGS. 4A-4C and FIG. 5, including a second screen device, an interface device, a mobile device, a set top box, or other computing device. The computing device may transmit the event message to any device registered to receive event messages, or may transmit the event message to any recipient defined in the event messaging criteria. The event message can also be transmitted via e-mail, instant message (or a message conforming to a protocol suitable for instant messaging), as a post onto a user's social networking site (e.g., the user's Facebook feed or Twitter feed), SMS, Internet Protocol packet, or other messaging standard. In some embodiments, whether the event message includes the video data, includes a link to the video data, or uses video stored to a user's DVR may be based on the manner in which the computing device is transmitting the event message. For example, if the event message is transmitted by e-mail, the computing device may include the video data as an attachment, but if the event message is transmitted by SMS, the computing device may only include a link to the video data.

The above steps of FIG. 6A describe a process where event messages may be generated and transmitted to a user. While event messages are generated and transmitted, a user may be viewing and interacting with the received event messages. FIG. 6B describes a method for processing user input associated with the event messaging service that is received at a computing device. In some arrangements, the example method of FIG. 6B may be operating in parallel with the example method of FIG. 6A (or may be operating on a different computing device). Referring now to FIG. 6B, at step 611, a computing device may determine whether a user input message has been received. The user input message may identify various user interactions related to the event messages, including user input that requests changes to the event message criteria (e.g., add a new event message or delete an event message from being generated). The user input message may also include a command to change a video feed or to view a video segment (e.g., based upon a user's selection of an event message), to share an event message, change a channel, etc. In general, any user interaction described herein (see description of FIGS. 4A-4C, 5, 6A, 6B and 7A) may cause user input to be transmitted to the computing device if the computing device or another device at the local office or under control of the content provider is involved in processing the user input (e.g., a content server may need to modify a video feed transmitting to the user's premises).

At step 613, a computing device may process the user input message. This step involves performing any of the necessary steps to perform the interactions represented by the user input message that was received at step 611 (e.g., add the event message to the event message criteria so that the event message will be generated and transmitted to the user device, remove the event message from the event message criteria, change a video feed to display a requested video feed or video segment, etc.). For example, if the user input message is an event message selection, user input message may include an identification of the selected event message and an identifier of one or more destination devices (e.g., an address of a first screen device and/or a second screen device). The event message that was selected by a user may be identified based on the received user input message, the selected event message may be retrieved from the event message log, and the content identified by the selected event message may be retrieved and transmitted to the one or more destination devices. As another example, if the user input message is for changing the event message criteria, the user profile and the change to the event message criteria may be identified based on the user input message, and the event message criteria and/or the user profile may be changed according to the specified change (e.g., add/delete event message criteria). Processing a user input message may include sending and transmitting data to any number of devices, such as, for example, devices at the content provider's local office and devices under the control of other content distribution networks, in order to complete the user interaction.

Figure 7A:
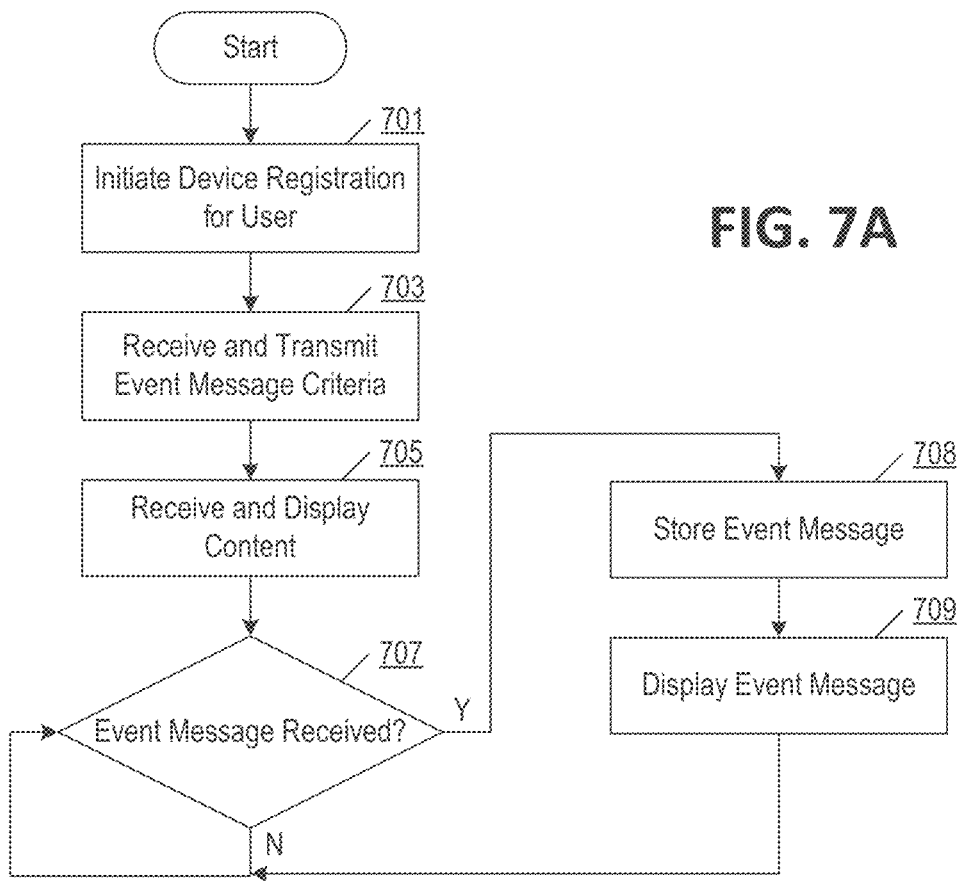
FIGS. 7A and 7B are flow diagrams illustrating example methods in accordance with various aspects of this disclosure.
Figure 7B:
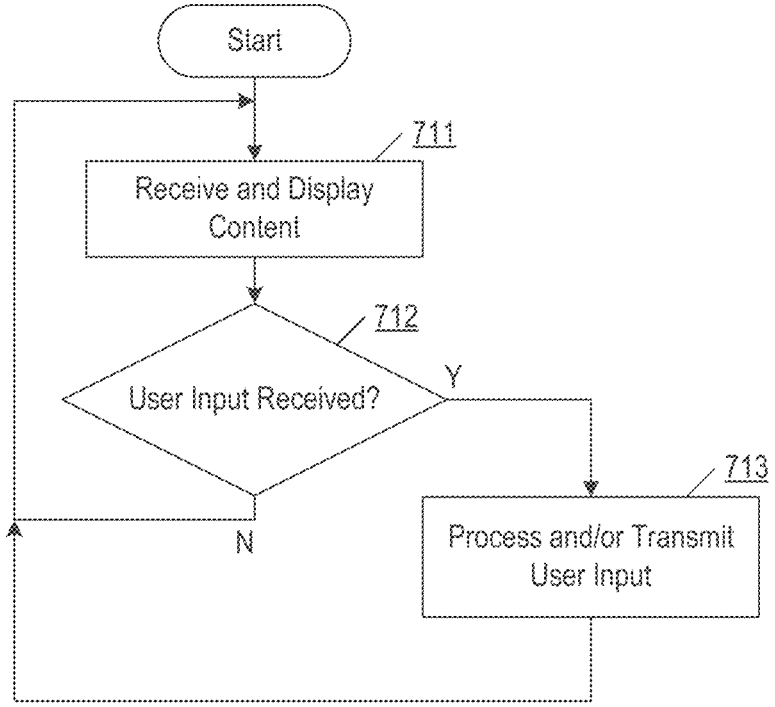

FIGS. 7A and 7B are flow diagrams illustrating example methods in which a computing device may receive and display event messages to a user. In particular, FIG. 7A illustrates an example method in which event messages are received and displayed. FIG. 7B illustrates an example method in which user input can be received and transmitted to, for example, cause a change in event message criteria or cause a change in the video being transmitted to the user's premises. While the example methods of FIGS. 7A and 7B can be performed by one or more devices located at a user's premises (e.g., a tablet computer, interface device, set top box, gateway device, or other suitable computing device depicted at FIG. 1 or FIG. 3), portions of the methods may be performed at other computer devices, such as a computing device including a server of a content provider at a local office.

Referring now to FIG. 7A, at step 701, a computing device may initiate device registration for event messaging. In some instances, this step may be begun by a user selecting to begin an event messaging service on one or more devices. For example, the user may be consuming content on the computing device and decide they want to receive event messages on the computing device for a football game while they watch a movie on a different channel. To initiate the event messaging, a user may have to initiate or log in to an application or web site to begin the event messaging service. The computing device may transmit a message that includes device registration data such as an identifier of the computing device (e.g., the device's MAC address or IP address). Additionally, the user may also specify what devices the event messages are to be received on. Accordingly, the message may include identifiers for one or more devices different than the computing device. The message may also include the log in information (e.g., username and password) for the user in order for the user to complete the log-in process to the event messaging service. The message may also include a user profile that was generated by the user or stored at the computing device.

At step 703, a computing device may receive and transmit event message criteria. In some arrangements, a user may enter the event message criteria. When the user desires to enter event message criteria, the user may view a display that allows a user to insert or choose the criteria for an event message the user wishes to receive whenever the specified event occurs. In some embodiments, the display for entering the event message criteria may include fields for a different type of criteria that a user may choose from. For example, the user may select from a drop down menu to specify what type of content the event message is for, such as to specify that the event message is for a sporting event, a movie, a television show, a fantasy game, etc. Based on the user's selection, a new set of fields may be displayed that allow the user to enter in the other criteria for the event message. For example, if the event message is for a fantasy game, the data fields may be a number of text entry fields for the players in the fantasy lineup's starting lineup and additional fields for inserting the scoring rules of the fantasy league. If the event message is for a sporting event, the data fields may be various fields allowing the user to choose what types of plays should cause an event message to be generated (e.g., scoring plays, turnovers, plays involving particular players, etc.). Of course, a user does not need to define additional criteria. In some instances, the user may wish to view every event that occurs for particular content. For example, the user may define event message criteria so messages are generated for every event that occurs in a football game or for every scene in a television program. In some arrangements, an event message may be generated every time the content segmentation process determines a new content segment for that football game or television program. In other words, the system determines that an event occurs whenever a new segment for the content is determined by the content segmentation process. The criteria entered by a user may be stored as part of a user profile (either stored locally or on the network).

Criteria may also be generated by a computing device. For example, criteria may be generated based on the user's previous usage or content consumption history. In some arrangements, generated criteria (e.g., criteria not input by a user) may be presented to a user for approval or rejection. If approved, the generated criteria may be used to generate event messages and/or stored as part of the user profile.

At step 705, a computing device may display received video. The received video may include one or more video feeds. For example, a video feed may be received for a video program being viewed by the user on the screen device (e.g., video program 402, 412 and 422 of FIGS. 4A-4C and video program 502 or 512 of FIG. 5). This step of displaying received video may continue as the other steps of FIGS. 7A and 7B are performed.

At step 707, a computing device may determine whether an event message has been received. In general, the computing device may be iteratively checking for new event messages as data is received at the computing device. Additionally, in some arrangements, the computing device will only begin to determine whether event messages have been received when the user has properly registered the device for event messaging. For example, the computing device may receive a message from a content provider indicating that the device has completed registration for event messaging. Until the device receives the message indicating that registration is complete, the device may not check for event messages. If an event message has been received, the method may proceed to option step 708, in some embodiments, or step 709, in others. Otherwise, the method may continue to monitor for new event messages by returning to step 707 to repeat the determination.

At optional step 708, a computing device may store the event message. This may include storing the event message in a local database or a network database accessible to the computing device.

At step 709, a computing device may display the event message. Displaying the event message may include display the event message in various ways, including the arrangements described in connection with FIGS. 4A-4C and 5, or combinations thereof.

Upon display of the event message, the user may be able to view the message and decide whether to select the event message and view the video of the event. In addition to selecting an event message, a user may perform various other interactions to modify the event messaging service or the video being displayed. FIG. 7B describes a method for processing user input. In some arrangements, the example method of FIG. 7B may be operating in parallel with the example method of FIG. 7A. Referring now to FIG. 7B, at step 711, a computing device may receive and display video. In some arrangements, the received video may be the same video that was displayed at step 702 of FIG. 7A.

At step 712, a computing device may determine whether user input has been received. The user may perform various interactions related to the event messages, including a command to change a video feed or to view a video segment (e.g., based upon a user's selection of an event message). In general, any of the above described user interactions (see above description of FIGS. 4A-4C, 5, 6A, 6B and 7A) may be received at this step.

At step 713, a computing device may process and/or transmit the user input. For example, the computing device may need to determine whether the user interaction can be processed locally or whether it must be transmitted to a computing device for processing. Some interactions, such as a command to change a video feed or, in some embodiments, view a video of an event message, may need to be transmitted to a computing device for further processing. In such instances, the computing device may generate a user input message that includes the user input and any additional data needed by user input. For example, if the user input is an event message selection, user input message may be generated to include an identification of the selected event message and an identifier of one or more destination devices (e.g., an address of a first screen device and/or a second screen device) depending on where the user is to view the content corresponding to the selected event message. As another example, if the user input is to change the event message criteria, the user input message may be generated to include the user profile or a location of the user profile, and data identifying the change to the event message criteria.

However, some interactions may not be transmitted to a computing device. For example, a user interaction to dismiss the event message or view more detailed information about an event message may not be transmitted to the computing device in some embodiments. Such embodiments may include when the alert is only to be dismissed from a local repository of event messages or the detailed information may be found in the local repository of event messages. This, however, is generally dependent on the system implementation. Notably, if the event messages were stored at the computing device or at another network device, interactions such as dismissing an event message or viewing more detailed information may need to be transmitted to that device.

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above. For example, the steps illustrated in the illustrative figures may be performed in other than the recited order, and one or more steps illustrated may be optional in accordance with aspects of the disclosure. It will also be appreciated and understood that modifications may be made without departing from the true spirit and scope of the present disclosure. The description is thus to be regarded as illustrative instead of restrictive on the present disclosure.

The invention claimed is:

1. A method comprising:
   identifying, from video content, video segments that depict a plurality of events matching event criteria;
   generating an event message that comprises an identifier or link configured to enable the video segments to be requested;
   sending the event message to a second device;
   receiving, from the second device and after sending the event message to the second device, a first request for the video segments based on the identifier or the link;
   sending, to the second device and based on the first request, the video segments;
   receiving, from the second device, a second request to send the video segments to a first device; and
   sending, to the first device, at least one of the video segments based on the second request.

2. The method of claim 1, wherein the video content comprises a video program, and wherein generating the event message is performed after a determination, based on user-defined criteria specifying when the event message is to be generated, that a transmission of the video program is complete.

3. The method of claim 1, further comprising:
   receiving event messaging criteria that specifies players on a fantasy team of a user, wherein each of the video segments depicts an event that:
     involves one of the players;
     occurred in one or more sporting games; and
     contributed to a score of the fantasy team.

4. The method of claim 1, wherein sending the event message to the second device comprises sending the event message via an e-mail message, a short messaging service (SMS) message, a message conforming to a protocol suitable for instant messaging, or a message posted to a social media account of a user.

5. The method of claim 1, wherein the event criteria is based on received, user-defined criteria.

6. The method of claim 1, further comprising:
   receiving event messaging criteria that specifies players on a fantasy team of a user, wherein each of the video segments depicts an event that:
     involves one of the players;
     occurred in one or more sporting games; and
     contributed to a score of the fantasy team; and
   inserting, into a sequence of the video segments, a video segment that depicts an occurrence that failed to contribute to the score of the fantasy team.

7. The method of claim 1, wherein the first device is in communication with a television being watched by a user and the second device comprises a tablet computing device, mobile computing device, or personal computer device that is being used by the user.

8. The method of claim 1, further comprising:
   adding the event message to an event message log;
   receiving a request to view the event message log;
   receiving a selection of a logged event message from the event message log, wherein the logged event message corresponds to a content segment; and
   sending the content segment to one or more devices.

9. The method of claim 1, further comprising:
   matching, to determine an occurrence of a first of a plurality of events, first event criteria to data describing one or more first video segments;
   matching, to determine an occurrence of a second of the plurality of events, second event criteria to data describing one or more second video segments; and
   ordering the one or more first video segments and the one or more second video segments in a sequence of the video segments according to user-defined criteria,
   wherein the first event criteria and the second event criteria are both based on information specified by a user.

10. The method of claim 1, further comprising:
    registering the first device and the second device to receive event messages; and
    sending the event message to the first device after registering the first device and the second device to receive event messages.

11. A method comprising:
    identifying, from video content, video segments that depict an event matching event criteria;
    generating an event message that comprises an identifier or link configured to enable the video segments to be requested;
    sending the event message to a first device;
    receiving, from the first device and after sending the event message to the first device, a first request for the video segments based on the identifier or the link;
    sending, to the first device and based on the first request, the video segments; and
    receiving, from the first device and after sending the event message to the first device, a second request, based on the event message.

12. The method of claim 11, wherein said second request is to send the identifier or link to a social media application.

13. The method of claim 11, wherein said second request is to record, based on the video segments, a video program.

14. The method of claim 11, the method further comprising:
    receiving, from the first device, a third request to send the video segments to a second device; and
    sending, to the second device, at least one of the video segments based on the second request.

15. The method of claim 14, wherein the first device is being used by a first user and comprises a tablet computing device, mobile computing device, or personal computer device, and wherein the second device is in communication with a television being watched by a second user.

16. The method of claim 11, wherein the event matching criteria is based on data specifying user-defined criteria for determining when events occur in video content.

17. The method of claim 11, further comprising:
    receiving event criteria that specifies players on a fantasy team of a user, wherein each of the video segments depicts an event that:
      involves one of the players;
      occurred in one or more sporting games; and
      contributed to a score of the fantasy team.

18. The method of claim 11, further comprising:
    matching, to determine an occurrence of a first of a plurality of events, first event criteria to data describing one or more first video segments;

matching, to determine an occurrence of a second of the plurality of events, second event criteria to data describing one or more second video segments; and ordering the one or more first video segments and the one or more second video segments in a sequence of the video segments according to user-defined criteria, wherein the first event criteria and the second event criteria are both based on information specified by a user.

19. The method of claim 18, further comprising:

registering a second device to receive event messages; and sending the event message to the second device.

20. The method of claim 11, wherein the video content comprises a video program, and wherein generating the event message is performed after a determination, based on user-defined criteria specifying when the event message is to be generated, that a transmission of the video program is complete.

* * * * *

UNITED STATES PATENT AND TRADEMARK OFFICE
CERTIFICATE OF CORRECTION

| | | |
|---|---|---|
| PATENT NO. | : 11,601,720 B2 | |
| APPLICATION NO. | : 17/100341 | |
| DATED | : March 7, 2023 | |
| INVENTOR(S) | : Chipman et al. | |

It is certified that error appears in the above-identified patent and that said Letters Patent is hereby corrected as shown below:

In the Specification

Column 6, Line 49:
Delete "30" and insert --303-- therefor

Signed and Sealed this
Twenty-eighth Day of May, 2024

*Katherine Kelly Vidal*
Katherine Kelly Vidal
*Director of the United States Patent and Trademark Office*